United States Patent
Apthorp

(10) Patent No.: US 11,711,353 B2
(45) Date of Patent: Jul. 25, 2023

(54) AUTHENTICATED SERVICE APPLICATION SESSIONS USING VISUAL AUTHENTICATION INDICIA

(71) Applicant: SLACK TECHNOLOGIES, LLC, San Francisco, CA (US)

(72) Inventor: Jeremy Apthorp, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 431 days.

(21) Appl. No.: 16/706,352

(22) Filed: Dec. 6, 2019

(65) Prior Publication Data

US 2020/0186519 A1 Jun. 11, 2020

Related U.S. Application Data

(60) Provisional application No. 62/776,651, filed on Dec. 7, 2018.

(51) Int. Cl.
*H04L 29/06* (2006.01)
*H04L 9/40* (2022.01)
*G06F 21/12* (2013.01)

(52) U.S. Cl.
CPC .......... *H04L 63/0815* (2013.01); *G06F 21/12* (2013.01); *G06F 21/121* (2013.01); *H04L 63/08* (2013.01); *H04L 63/10* (2013.01)

(58) Field of Classification Search
CPC ........ G06F 21/12; G06F 21/121; G06F 21/36; H04L 63/08; H04L 63/10; H04L 63/0815
See application file for complete search history.

(56) References Cited

U.S. PATENT DOCUMENTS 5,958,008 A * 9/1999 Pogrebisky ........... G06F 16/958
709/223
6,470,386 B1 * 10/2002 Combar .............. G06F 11/0784
705/40

(Continued)

OTHER PUBLICATIONS

P.A. Cabarcos et al. SuSSo: Seamless and Ubiquitous Single Sign-On for Cloud Service Continuity Across Devices, Nov. 2012, IEEE, pp. 1425-1433. (Year: 2012).*

(Continued)

*Primary Examiner* — Philip J Chea
*Assistant Examiner* — Jenise E Jackson
(74) *Attorney, Agent, or Firm* — Holland & Hart LLP

(57) ABSTRACT

Embodiments of the present disclosure provide methods, systems, apparatuses, and computer program products that are configured to provide authenticated access to a service application. The embodiments disclose an apparatus and system configured to launch an authenticated service application session in response to capturing authentication success rendering comprising visual authentication indicia. The authentication success rendering is a captured via a user device display, and includes visual authentication indicia. To facilitate rendering of the authentication success rendering, embodiments output a browser sign-in session request configured to launch a browser sign-in session associated with a browser application. Additionally, to facilitate capturing the rendering, embodiments initiate a display recorder module configured to capture, during the browser sign-in session and via the user device display, authentication success rendering comprising visual authentication indicia. Embodiments may be configured to parse the captured authentication success rendering to identify the visual authentication indicia, and decode the visual authentication indicia to identify user authentication data. Finally, embodiments may (Continued)

execute a service application sign-in protocol using the user authentication data to launch the authenticated service application session.

19 Claims, 9 Drawing Sheets

(56) References Cited

U.S. PATENT DOCUMENTS

| | | | | |
|---|---|---|---|---|
| 9,203,824 | B1* | 12/2015 | Nunn | H04L 63/08 |
| 9,516,018 | B1* | 12/2016 | Vazquez | H04L 63/0853 |
| 9,887,992 | B1* | 2/2018 | Venkat | G06F 21/35 |
| 10,411,894 | B1* | 9/2019 | Yavnilovich | G06F 21/32 |
| 10,701,067 | B1* | 6/2020 | Ziraknejad | G06F 21/6209 |
| 11,043,190 | B1* | 6/2021 | Broderick | G06F 21/36 |
| 2007/0050844 | A1* | 3/2007 | Lebel | G06F 11/3466 726/13 |
| 2014/0195858 | A1* | 7/2014 | Cohen | G06F 11/3672 714/38.14 |
| 2016/0234198 | A1* | 8/2016 | Breiman | H04L 67/141 |
| 2016/0253481 | A1* | 9/2016 | Tian | H04L 63/08 726/7 |
| 2018/0287982 | A1 | 10/2018 | Draeger et al. | |
| 2019/0037613 | A1* | 1/2019 | Anantharaman | H04W 12/06 |

OTHER PUBLICATIONS

Qiang etal, The Design and Implementation of Standards-Based Grid Single Sign-On Using Federated Identity, Sep. 3, 2010 , IEEE, pp. 458-464. (Year: 2010).*
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 17 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014)2 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

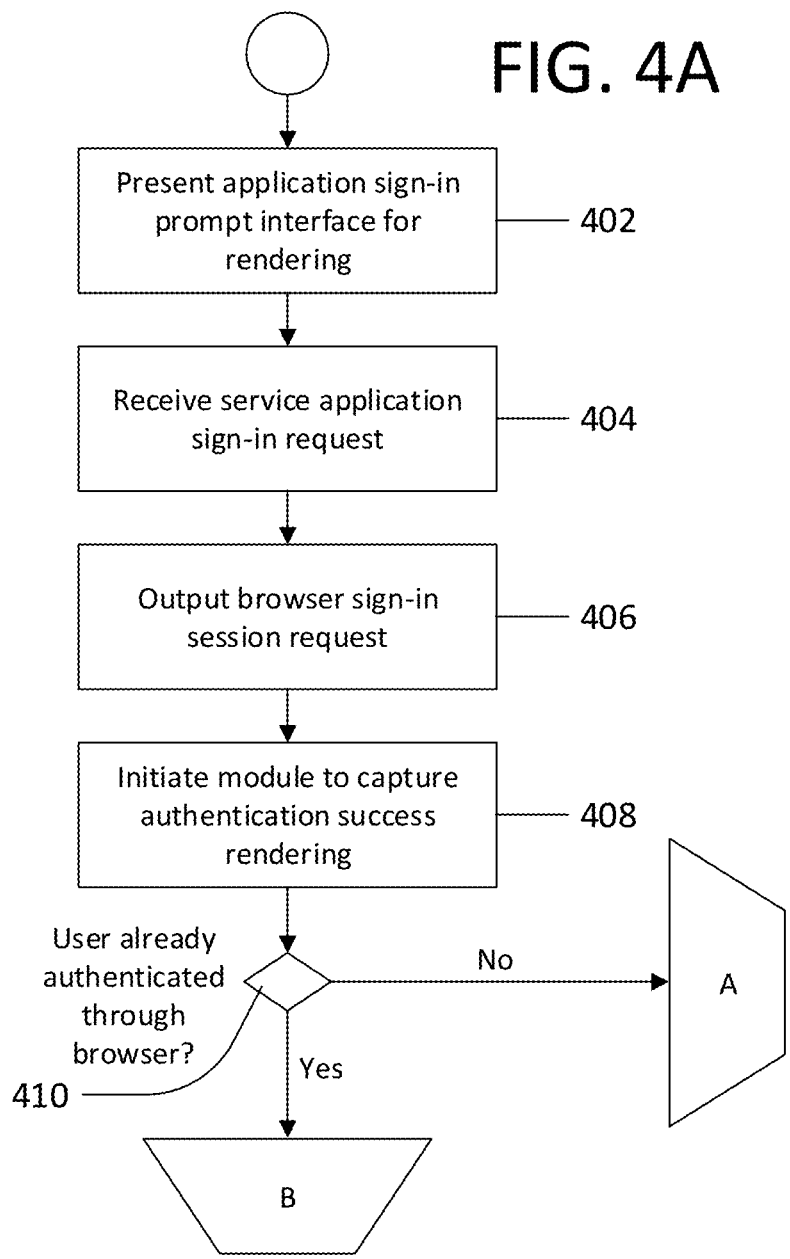

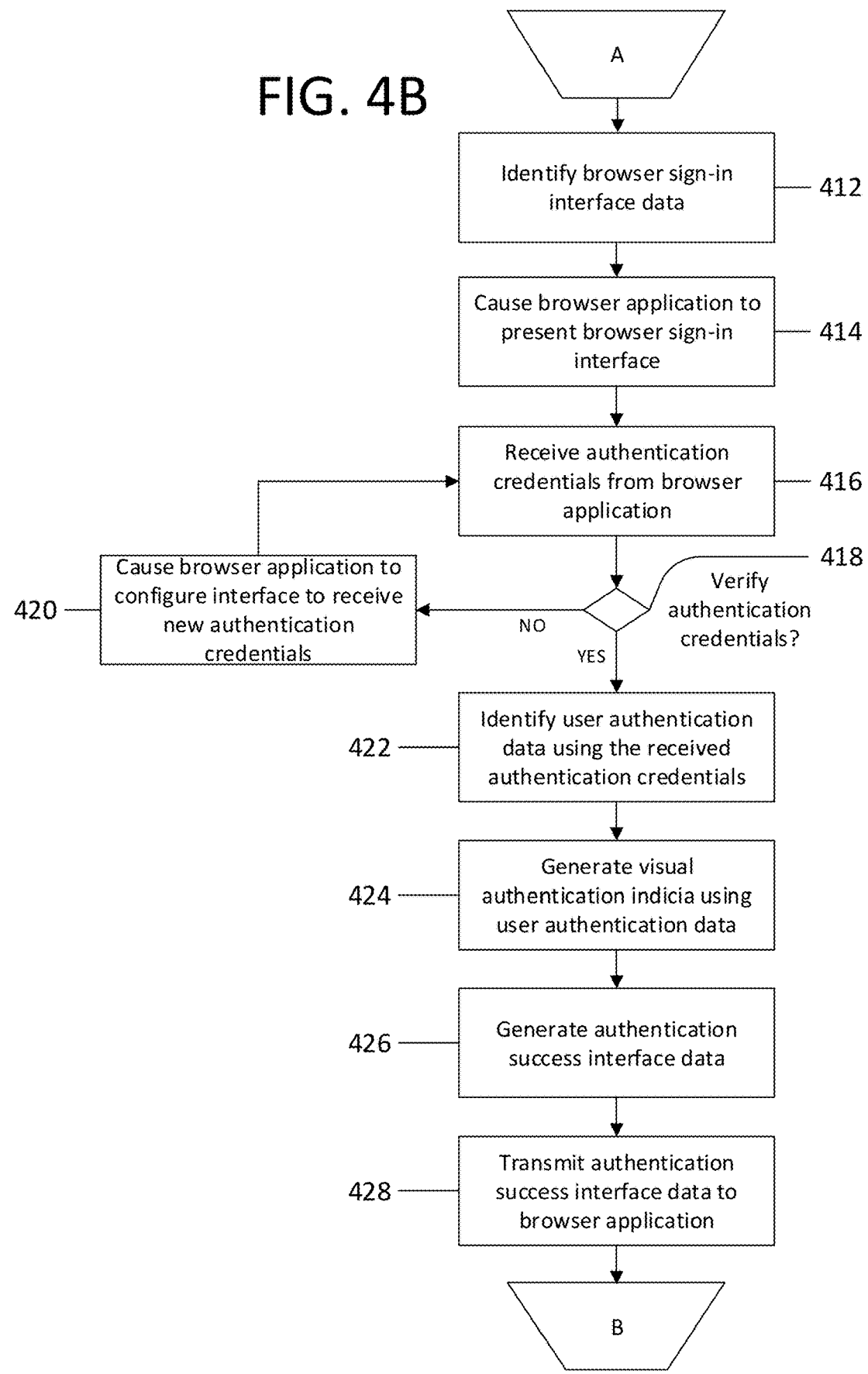

AUTHENTICATED SERVICE APPLICATION SESSIONS USING VISUAL AUTHENTICATION INDICIA

TECHNOLOGICAL FIELD

This application claims priority to U.S. Provisional Application No. 62/776,651, filed Dec. 7, 2018, the content of which is incorporated herein in its entirety.

TECHNOLOGICAL FIELD

Embodiments of the invention relate, generally, to launching authenticated service application sessions, and more specifically, to outputting a browser sign-in session request configured to launch a browser sign-in session, capturing an authentication success rendering including visual authentication indicia and, in response, launching an authenticated service application session.

BACKGROUND

Various software applications require user authentication, such as signing in with a username and password, before allowing a user to utilize a service application. Applicant has identified a number of deficiencies and problems associated with service application authentication. Through applied effort, ingenuity, and innovation, many of these identified problems have been solved by developing solutions that are included in embodiments of the present disclosure, many examples of which are described in detail herein.

BRIEF SUMMARY

Embodiments herein are directed to providing authenticated access to a service application, specifically to launching one or more authenticated service application sessions. An example embodiment includes an apparatus configured to provide authenticated access to a service application. The example apparatus includes at least a processor, and a memory associated with the processor having computer coded instructions therein. The memory and computer coded instructions are configured to, with the processor, cause the apparatus to output, utilizing a service application module, a browser sign-in session request configured to launch a browser sign-in session associated with a browser application. The example apparatus is also caused to initiate a display recorder module configured to capture, during the browser sign-in session via a user device display, an authentication success rendering comprising visual authentication indicia. The example apparatus is also caused to, in response to capturing the authentication success rendering comprising the visual authentication indicia, launch, utilizing a recorded authentication module, an authenticated service application session.

In some embodiment apparatuses, the apparatus is further caused to present, utilizing the service application module, a service application sign-in prompt interface for rendering via the user device display. In some embodiments, the apparatus is further caused to receive, utilizing the service application module, a service application sign-in request in response to user engagement with the service application sign-in prompt interface.

In some embodiment apparatuses, the computer coded instructions configured to cause the apparatus to launch the authenticated service application session comprise computer coded instructions configured to cause the apparatus to parse, utilizing the recorded authentication module and utilizing a visual indicia decoder, the authentication success rendering to identify the visual authentication indicia; decode, utilizing the recorded authentication module and utilizing the visual indicia decoder, the visual authentication indicia to identify user authentication data; and execute, utilizing the recorded authentication module, a service application sign-in protocol using the user authentication data to launch the authenticated service application session.

In some embodiment apparatuses, the apparatus is further caused to configure, utilizing the recorded authentication module, the authenticated service application session to authenticate service requests made during the authenticated service application session using the user authentication data.

In some embodiment apparatuses, the computer coded instructions configured to cause the apparatus to launch the authenticated service application session comprise computer coded instructions configured to cause the apparatus to parse, utilizing the recorded authentication module and the visual indicia decoder, the authentication success rendering to identify a first visual authentication indicia portion associated with a first visual authentication indicia rendering; parse, utilizing the recorded authentication module and the visual indicia decoder, the authentication success rendering to identify a second visual authentication indicia portion associated with a second visual authentication indicia rendering; and identify the visual authentication indicia using the first visual authentication indicia portion and second visual authentication indicia portion.

In some embodiment apparatuses, the apparatus is further caused to capture, utilizing the display recorder module, a first authentication success rendering comprising a first visual authentication indicia rendering; and capture, utilizing the display recorder module, a second authentication success rendering comprising a second visual authentication indicia rendering. In some variations of this embodiment, the computer coded instructions configured to cause the apparatus to parse, utilizing the recorded authentication module, the authentication success rendering to identify the visual authentication indicia comprises computer coded instructions configured to cause the apparatus to parse, utilizing the recorded authentication module and the visual indicia decoder, the first authentication success rendering to identify the first visual authentication indicia rendering; parse, utilizing the recorded authentication module and the visual indicia decoder, the second authentication success rendering to identify the second visual authentication indicia rendering; and identify the visual authentication indicia using the first visual authentication indicia rendering and the second visual authentication indicia rendering.

In some embodiment apparatuses, the apparatus is further caused to identify, utilizing the recorded authentication module, a visual indicia type associated with the visual authentication indicia; and identify, utilizing the recorded authentication module, the visual indicia decoder associated with the visual indicia type.

In some embodiment apparatuses, the browser sign-in session request output by the apparatus is further configured to cause the browser application to prompt interaction with a credentials manager.

In some embodiment apparatuses, the computer coded instructions configured to cause the apparatus to parse, utilizing the recorded authentication module and utilizing the visual indicia decoder, the authentication success rendering to identify the visual authentication indicia comprises computer coded instructions configured to cause the apparatus to parse, utilizing the recorded authentication module and utilizing the visual indicia decoder, the authentication success rendering to identify the visual authentication indicia from a plurality of visual authentication indicia renderings presented in a repeated manner.

In some embodiment apparatuses, the visual authentication indicia identifies at least one authentication data cache location storing user authentication data.

In some embodiment apparatuses, the visual authentication indicia encodes an authentication token.

In some embodiment apparatuses, the apparatus is further caused to detect, utilizing an abandonment detection module, a session abandonment event associated with the browser sign-in session; and terminate capture by the display recorder module.

In some embodiment apparatuses, the apparatus is further caused to identify, utilizing an abandonment detection module, a timeout value; track, utilizing the abandonment detection module, a recording time associated with the display recorder module; determine, utilizing the abandonment detection module, the recording time exceeded the timeout value; and terminate capture by the display recorder module.

In another example embodiment, another exemplary apparatus may be provided for. The alternative exemplary apparatus includes at least a processor, and a memory associated with the processor having computer coded instructions therein. The memory and computer coded instructions are configured to, with the processor, cause the alternative exemplary apparatus to present, utilizing a service application module, a service application sign-in prompt interface for rendering via a user device display. The alternative exemplary apparatus is further caused to receive, utilizing the service application module, a service application sign-in request in response to user engagement with the service application sign-in prompt interface. The alternative exemplary apparatus is further caused to initiate a display recorder module configured to capture an authentication success rendering comprising visual authentication indicia presented to the user device display during the browser sign-in session. The alternative exemplary apparatus is further caused to initiate an abandonment detection module configured to detect a session abandonment event. The alternative exemplary apparatus is further caused to output, utilizing the service application module, a browser sign-in session request configured to launch a browser sign-in session associated with a browser application, wherein the browser sign-in session causes the browser application to (1) request, from an application server, browser sign-in interface data, wherein the browser sign-in interface data is configured to represent a browser sign-in interface, wherein the browser sign-in interface is configured to receive authentication credentials, (2) present, to the user device display during the browser sign-in session, the browser sign-in interface using the browser sign-in interface data, (3) transmit, to the application server, an input authentication credential set, (4) cause the application server to verify the input authentication credential set using an authentication process, identify user authentication data using the input authentication credential set, generate visual authentication indicia that encodes the user authentication data, and generate authentication success interface data, wherein the authentication success interface data is configured to represent an authentication success interface comprising the visual authentication indicia, and (6) present, to the user device display for rendering during the browser sign-in session, the authentication success interface. The alternative exemplary apparatus is further caused to capture, utilizing the display recorder module, an authentication success rendering comprising the visual authentication indicia. The alternative exemplary apparatus is further caused to identify a visual indicia type. The alternative exemplary apparatus is further caused to identify a visual indicia decoder. The alternative exemplary apparatus is further caused to parse, utilizing a recorded authentication module and utilizing the visual indicia decoder, the authentication success rendering to identify the visual authentication indicia. The alternative exemplary apparatus is further caused to decode, utilizing the recorded authentication module and utilizing the visual indicia decoder, the visual authentication indicia to identify user authentication data. The alternative exemplary apparatus is further caused to execute, utilizing the recorded authentication module, a service application sign-in protocol using the user authentication data to launch an authenticated service application session.

In another example embodiment, a computer-implemented method for providing authenticated access to a service application may be provided for. The example method includes outputting, utilizing a service application module, a browser sign-in session request configured to launch a browser sign-in session associated with a browser application. The example method also includes initiating a display recorder module configured to capture, during the browser sign-in session via a user device display, an authentication success rendering comprising visual authentication indicia. The example method then includes, in response to capturing the authentication success rendering comprising the visual authentication indicia, launching, utilizing a recorded authentication module, an authenticated service application session.

In some embodiment computer-implemented methods, the computer-implemented method further includes presenting, utilizing the service application module, a service application sign-in prompt interface for rendering via the user device display. In some embodiments, the computer-implemented method further includes receiving, utilizing the service application module, a service application sign-in request in response to user engagement with the service application sign-in prompt interface.

In some embodiment computer-implemented methods, launching the authenticated service application session comprises parsing, utilizing the recorded authentication module and utilizing a visual indicia decoder, the authentication success rendering to identify the visual authentication indicia; decoding, utilizing the recorded authentication module and utilizing the visual indicia decoder, the visual authentication indicia to identify user authentication data; and executing, utilizing the recorded authentication module, a service application sign-in protocol using the user authentication data to launch the authenticated service application session.

In some embodiment computer-implemented methods, the method further includes configuring, utilizing the recorded authentication module, the authenticated service application session to authenticate service requests made during the authenticated service application session using the user authentication data.

In some embodiment computer-implemented methods, launching the authenticated service application session includes parsing, utilizing the recorded authentication module and the visual indicia decoder, the authentication success rendering to identify a first visual authentication indicia portion associated with a first visual authentication indicia rendering; parsing, utilizing the recorded authentication module and the visual indicia decoder, the authentication success rendering to identify a second visual authentication indicia portion associated with a second visual authentication indicia rendering; and identifying the visual authentication indicia using the first visual authentication indicia portion and second visual authentication indicia portion.

In some embodiment computer-implemented methods, the method further includes capturing, utilizing the display recorder module, a first authentication success rendering comprising a first visual authentication indicia rendering; and capturing, utilizing the display recorder module, a second authentication success rendering comprising a second visual authentication indicia rendering. In some variations of this embodiment, causing the apparatus to parse, utilizing the recorded authentication module, the authentication success rendering to identify the visual authentication indicia includes causing the apparatus to parse, utilizing the recorded authentication module and the visual indicia decoder, the first authentication success rendering to identify the first visual authentication indicia rendering; parsing, utilizing the recorded authentication module and the visual indicia decoder, the second authentication success rendering to identify the second visual authentication indicia rendering; and identifying the visual authentication indicia using the first visual authentication indicia rendering and the second visual authentication indicia rendering.

In some embodiment computer-implemented methods, the method further includes identifying, utilizing the recorded authentication module, a visual indicia type associated with the visual authentication indicia; and identifying, utilizing the recorded authentication module, the visual indicia decoder associated with the visual indicia type.

In some embodiment computer-implemented methods, the browser sign-in session request is further configured to cause the browser application to prompt interaction with a credentials manager.

In some embodiment computer-implemented methods, causing the apparatus to parse, utilizing the recorded authentication module and utilizing the visual indicia decoder, the authentication success rendering to identify the visual authentication indicia includes parsing, utilizing the recorded authentication module and utilizing the visual indicia decoder, the authentication success rendering to identify the visual authentication indicia from a plurality of visual authentication indicia renderings presented in a repeated manner.

In some embodiment computer-implemented methods, the visual authentication indicia identifies at least one authentication data cache location storing user authentication data.

In some embodiment computer-implemented methods, the visual authentication indicia encodes an authentication token.

In some embodiment computer-implemented methods, the method further includes detecting, utilizing an abandonment detection module, a session abandonment event associated with the browser sign-in session; and terminating capture by the display recorder module.

In some embodiments computer-implemented methods, the method further includes identifying, utilizing an abandonment detection module, a timeout value; tracking, utilizing the abandonment detection module, a recording time associated with the display recorder module; determining, utilizing the abandonment detection module, the recording time exceeded the timeout value; and terminating capture by the display recorder module.

In another example embodiment, another exemplary computer-implemented method may be provided for. The exemplary method includes presenting, utilizing a service application module, a service application sign-in prompt interface for rendering via a user device display. The alternative exemplary method further includes receiving, utilizing the service application module, a service application sign-in request in response to user engagement with the service application sign-in prompt interface. The alternative exemplary method further includes initiating a display recorder module configured to capture an authentication success rendering comprising visual authentication indicia presented to the user device display during the browser sign-in session. The alternative exemplary method further includes initiating an abandonment detection module configured to detect a session abandonment event. The alternative exemplary method further includes outputting, utilizing the service application module, a browser sign-in session request configured to launch a browser sign-in session associated with a browser application, wherein the browser sign-in session causes the browser application to (1) request, from an application server, browser sign-in interface data, wherein the browser sign-in interface data is configured to represent a browser sign-in interface, wherein the browser sign-in interface is configured to receive authentication credentials, (2) present, to the user device display during the browser sign-in session, the browser sign-in interface using the browser sign-in interface data, (3) transmit, to the application server, an input authentication credential set, (4) cause the application server to verify the input authentication credential set using an authentication process, identify user authentication data using the input authentication credential set, generate visual authentication indicia that encodes the user authentication data, and generate authentication success interface data, wherein the authentication success interface data is configured to represent an authentication success interface comprising the visual authentication indicia, and (6) present, to the user device display for rendering during the browser sign-in session, the authentication success interface. The alternative exemplary method further includes capturing, utilizing the display recorder module, an authentication success rendering comprising the visual authentication indicia. The alternative exemplary method further includes identifying a visual indicia type. The alternative exemplary method further includes identifying a visual indicia decoder. The alternative exemplary method further includes parsing, utilizing a recorded authentication module and utilizing the visual indicia decoder, the authentication success rendering to identify the visual authentication indicia. The alternative exemplary method further includes decoding, utilizing the recorded authentication module and utilizing the visual indicia decoder, the visual authentication indicia to identify user authentication data. The alternative exemplary method further includes executing, utilizing the recorded authentication module, a service application sign-in protocol using the user authentication data to launch an authenticated service application session.

In another example embodiment, a computer program product for providing authenticated access to a service application may be provided for. An example computer program product includes at least one non-transitory computer-readable storage medium having computer-executable program code instructions stored therein. In the example computer program product, the computer-executable program code instructions includes program code instructions for outputting, utilizing a service application module, a browser sign-in session request configured to launch a browser sign-in session associated with a browser application. The example computer program product also includes program code instructions for initiating a display recorder module configured to capture, during the browser sign-in session via a user device display, an authentication success rendering comprising visual authentication indicia. The example computer program product also includes program code instructions for, in response to capturing the authentication success rendering comprising the visual authentication indicia, launching, utilizing a recorded authentication module, an authenticated service application session.

In some embodiment computer program products, the computer program product also includes program code instructions for presenting, utilizing the service application module, a service application sign-in prompt interface for rendering via the user device display. In some embodiments, the computer program product also includes program code instructions for receiving, utilizing the service application module, a service application sign-in request in response to user engagement with the service application sign-in prompt interface.

In some embodiment computer program products, launching the authenticated service application session comprises parsing, utilizing the recorded authentication module and utilizing a visual indicia decoder, the authentication success rendering to identify the visual authentication indicia; decoding, utilizing the recorded authentication module and utilizing the visual indicia decoder, the visual authentication indicia to identify user authentication data; and executing, utilizing the recorded authentication module, a service application sign-in protocol using the user authentication data to launch the authenticated service application session.

In some embodiment computer program products, the computer program product also includes program code instructions for configuring, utilizing the recorded authentication module, the authenticated service application session to authenticate service requests made during the authenticated service application session using the user authentication data.

In some embodiment computer program products, launching the authenticated service application session includes parsing, utilizing the recorded authentication module and the visual indicia decoder, the authentication success rendering to identify a first visual authentication indicia portion associated with a first visual authentication indicia rendering; parsing, utilizing the recorded authentication module and the visual indicia decoder, the authentication success rendering to identify a second visual authentication indicia portion associated with a second visual authentication indicia rendering; and identifying the visual authentication indicia using the first visual authentication indicia portion and second visual authentication indicia portion.

In some embodiment computer program products, the computer program product also includes program code instructions for capturing, utilizing the display recorder module, a first authentication success rendering comprising a first visual authentication indicia rendering; and capturing, utilizing the display recorder module, a second authentication success rendering comprising a second visual authentication indicia rendering. In some variations of this embodiment, causing the apparatus to parse, utilizing the recorded authentication module, the authentication success rendering to identify the visual authentication indicia includes causing the apparatus to parse, utilizing the recorded authentication module and the visual indicia decoder, the first authentication success rendering to identify the first visual authentication indicia rendering; parsing, utilizing the recorded authentication module and the visual indicia decoder, the second authentication success rendering to identify the second visual authentication indicia rendering; and identifying the visual authentication indicia using the first visual authentication indicia rendering and the second visual authentication indicia rendering.

In some embodiment computer program products, the computer program product also includes program code instructions for identifying, utilizing the recorded authentication module, a visual indicia type associated with the visual authentication indicia; and identifying, utilizing the recorded authentication module, the visual indicia decoder associated with the visual indicia type.

In some embodiment computer program products, the browser sign-in session request is further configured to cause the browser application to prompt interaction with a credentials manager.

In some embodiment computer program products, causing the apparatus to parse, utilizing the recorded authentication module and utilizing the visual indicia decoder, the authentication success rendering to identify the visual authentication indicia includes parsing, utilizing the recorded authentication module and utilizing the visual indicia decoder, the authentication success rendering to identify the visual authentication indicia from a plurality of visual authentication indicia renderings presented in a repeated manner.

In some embodiment computer program products, the visual authentication indicia identifies at least one authentication data cache location storing user authentication data.

In some embodiment computer program products, the visual authentication indicia encodes an authentication token.

In some embodiment computer program products, the computer program product also includes program code instructions for detecting, utilizing an abandonment detection module, a session abandonment event associated with the browser sign-in session; and terminating capture by the display recorder module.

In some embodiments computer program products, the computer program product also includes program code instructions for identifying, utilizing an abandonment detection module, a timeout value; tracking, utilizing the abandonment detection module, a recording time associated with the display recorder module; determining, utilizing the abandonment detection module, the recording time exceeded the timeout value; and terminating capture by the display recorder module.

In another example embodiment, another exemplary computer program product may be provided for. The exemplary computer program product includes at least one non-transitory computer-readable storage medium having computer-executable program code instructions stored therein. In the example computer program product, the computer-executable program code instructions includes program code instructions for presenting, utilizing a service application module, a service application sign-in prompt interface for rendering via a user device display. The alternative exemplary computer program product also includes program code instructions for receiving, utilizing the service application module, a service application sign-in request in response to user engagement with the service application sign-in prompt interface. The alternative exemplary computer program product further includes initiating a display recorder module configured to capture an authentication success rendering comprising visual authentication indicia presented to the user device display during the browser sign-in session. The alternative exemplary computer program product also includes program code instructions for initiating an abandonment detection module configured to detect a session abandonment event. The alternative exemplary computer program product also includes program code instructions for outputting, utilizing the service application module, a browser sign-in session request configured to launch a browser sign-in session associated with a browser application, wherein the browser sign-in session causes the browser application to (1) request, from an application server, browser sign-in interface data, wherein the browser sign-in interface data is configured to represent a browser sign-in interface, wherein the browser sign-in interface is configured to receive authentication credentials, (2) present, to the user device display during the browser sign-in session, the browser sign-in interface using the browser sign-in interface data, (3) transmit, to the application server, an input authentication credential set, (4) cause the application server to verify the input authentication credential set using an authentication process, identify user authentication data using the input authentication credential set, generate visual authentication indicia that encodes the user authentication data, and generate authentication success interface data, wherein the authentication success interface data is configured to represent an authentication success interface comprising the visual authentication indicia, and (6) present, to the user device display for rendering during the browser sign-in session, the authentication success interface. The alternative exemplary computer program product also includes program code instructions for capturing, utilizing the display recorder module, an authentication success rendering comprising the visual authentication indicia. The alternative exemplary computer program product also includes program code instructions for identifying a visual indicia type. The alternative exemplary computer program product further includes identifying a visual indicia decoder. The alternative exemplary computer program product also includes program code instructions for parsing, utilizing a recorded authentication module and utilizing the visual indicia decoder, the authentication success rendering to identify the visual authentication indicia. The alternative exemplary computer program product also includes program code instructions for decoding, utilizing the recorded authentication module and utilizing the visual indicia decoder, the visual authentication indicia to identify user authentication data. The alternative exemplary computer program product also includes program code instructions for executing, utilizing the recorded authentication module, a service application sign-in protocol using the user authentication data to launch an authenticated service application session.

In another embodiment, an apparatus configured to generate visual authentication indicia to provide authenticated access to a service application may be provided for. The apparatus may include at least a processor and a memory associated with the processor having computer coded instructions therein. The memory and the computer coded instructions configured to, with the processor, cause the apparatus to receive authentication credentials from the browser application; verify the authentication credentials using an authentication process; identify user authentication data using the authentication credentials; generate the visual authentication indicia, wherein the visual authentication indicia encodes the user authentication data; generate authentication success interface data, wherein the authentication success interface data is configured to represent an authentication success rendering comprising the visual authentication indicia; and transmit the authentication success interface data to the browser application during the browser sign-in session.

In some embodiment apparatuses, the apparatus is further caused to identify browser sign-in interface data, wherein the browser sign-in interface data is configured to represent a browser sign-in interface configured to receive authentication credentials; and cause the browser application to present, to the user device display for rendering during the browser sign-in session, the browser sign-in interface using the browser sign-in interface data.

In some embodiment apparatuses, the authentication credentials includes at least a username and a password.

In some embodiment apparatuses, the apparatus is further caused to receive the user authentication data from a service application; verify the user authentication data; and initiate an authenticated service application session associated with the service application.

In another embodiment, a computer-implemented method for generating visual authentication indicia for use in providing authenticated access to a service application may be provided for. The method includes receiving authentication credentials from the browser application. Additionally, the method includes verifying the authentication credentials using an authentication process. The method also includes identifying user authentication data using the authentication credentials. The method then includes generating the visual authentication indicia, wherein the visual authentication indicia encodes the user authentication data. The method then includes generating authentication success interface data, wherein the authentication success interface data is configured to represent an authentication success rendering comprising the visual authentication indicia. The method also includes transmitting the authentication success interface data to the browser application during the browser sign-in session.

In some embodiments computer-implemented methods, the method further includes identifying browser sign-in interface data, wherein the browser sign-in interface data is configured to represent a browser sign-in interface configured to receive authentication credentials; and causing the browser application to present, to the user device display for rendering during the browser sign-in session, the browser sign-in interface using the browser sign-in interface data.

In some embodiment computer-implemented methods, the authentication credentials comprise at least a username and a password.

In some embodiment computer-implemented methods, the method further includes receiving, from a service application, the user authentication data; verifying the user authentication data; and initiating an authenticated service application session associated with the service application.

In another embodiment, a computer program product for generating visual authentication indicia for use in providing authenticated access to a service application may be provided for. The computer program product includes at least one non-transitory computer-readable storage medium having computer-executable program code instructions stored therein. The program code instructions are configured for receiving authentication credentials from the browser application. The program code instructions are further configured for verifying the authentication credentials using an authentication process. Additionally, the program code instructions are further configured for identifying user authentication data using the authentication credentials. The program code instructions are further configured for generating the visual authentication indicia, wherein the visual authentication indicia encodes the user authentication data. The program code instructions are further configured for generating authentication success interface data, wherein the authentication success interface data is configured to represent an authentication success rendering comprising the visual authentication indicia. The program code instructions are further configured for transmitting the authentication success interface data to the browser application during the browser sign-in session.

In some embodiment computer program products, the computer program product further includes program code instructions for identifying browser sign-in interface data, wherein the browser sign-in interface data is configured to represent a browser sign-in interface configured to receive authentication credentials; and causing the browser application to present, to the user device display for rendering during the browser sign-in session, the browser sign-in interface using the browser sign-in interface data.

In some embodiment computer program products, the authentication credentials comprise at least a username and a password.

In some embodiment computer program products, the computer program product further includes program code instructions for receiving, from a service application, the user authentication data; verifying the user authentication data; and initiating an authenticated service application session associated with the service application.

BRIEF DESCRIPTION OF THE DRAWINGS

FIG. 4A illustrates a flowchart depicting various operations performed by a service application module in accordance with an example embodiment of the present invention.

FIG. 4B illustrates a flowchart depicting various operations performed by an application server in accordance with an example system within which embodiments of the present invention may operate.

DETAILED DESCRIPTION

Figure 1:
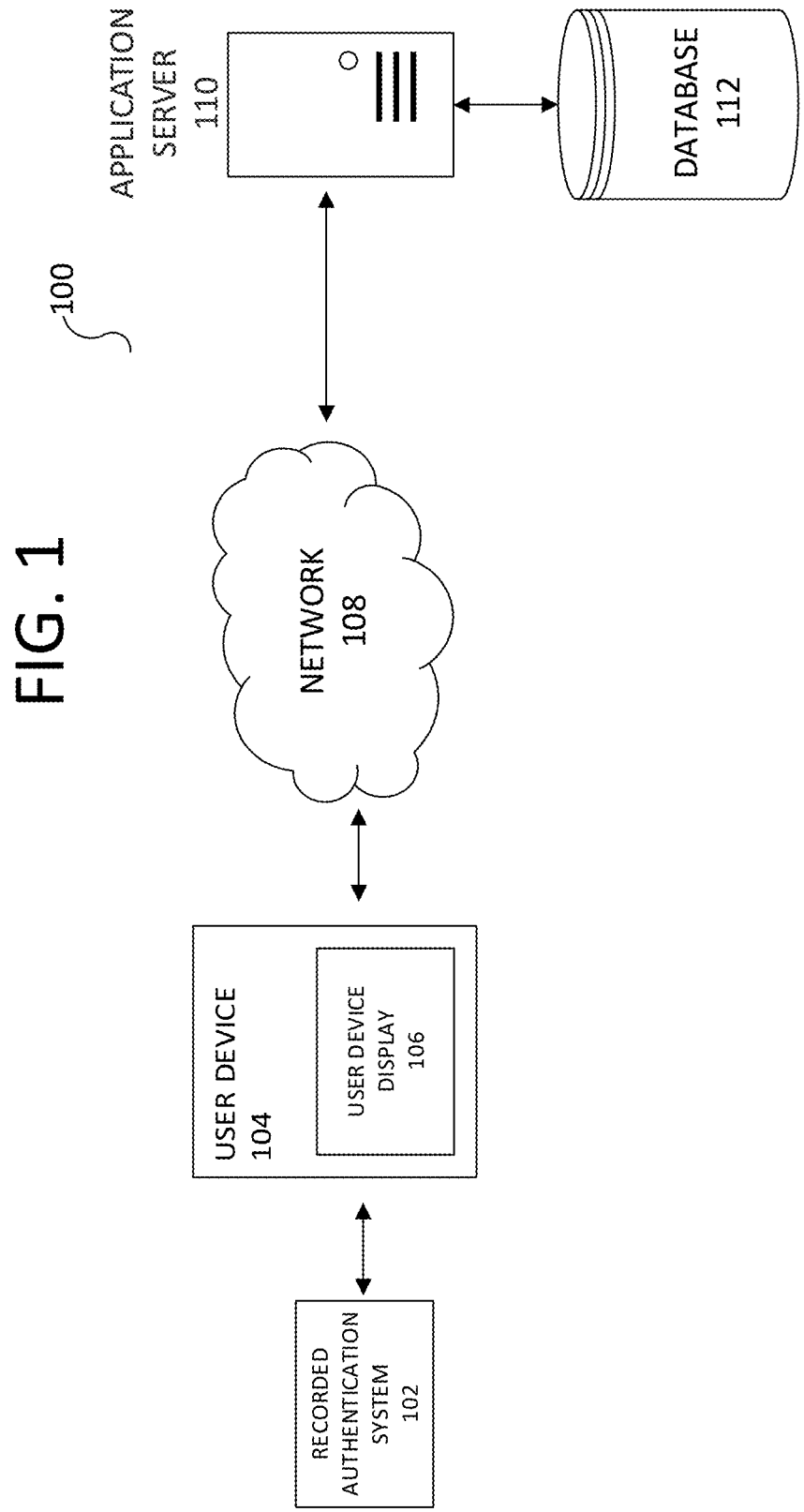
FIG. 1 shows a block diagram of a system that may be specially configured, within which embodiments of the present invention may operate.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data", "content", "information", and similar terms may be used interchangeably to refer to data capable of being captured, transmitted, received, displayed, and/or stored in accordance with various example embodiments. Thus, use of any such terms should not be taken to limit the spirit and scope of the disclosure. Further, where a computing device is described herein to receive data from another computing device, it will be appreciated that the data may be received directly from another computing device, or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to another computing device or it may be sent indirectly via one or more intermediary computing devices, such as, for example, one or more servers, relays, routers, network access points, base stations, and/or the like.

Overview

Service applications often require that a user authenticate undergo authentication before utilizing the service application. By authenticating a user, for example by using a username and password, service applications can identify a user account associated with the user and link all transactions, requests, and the like performed during a usage session to that user account. This increases security of the overall system by only allowing registered users to use the system, allows personalization of each user's experience, and allows for billing of services to an appropriate user.

However, authenticating a user directly via a service application is often not ideal. Instead, authenticating via a browser application may provide advantages over authenticating directly via a service application, such as compatibility with credentials managers, access to stored credentials and/or data when a user has previously authenticated, and other technical advantages that increase efficiency of the authentication process or increase system security. However, a corresponding service application often remains unaware when a user successfully authenticates via a browser application.

For example, when a user signs into a messaging service via a browser application, and then switches to the messaging service's local service application on a user device, the user will not be signed-in on the local service application.

Browsers, by default, are not configured to communicate directly with service applications. Thus, even though a browser application may receive data that can be used by a service application to verify authentication already occurred, there is a technical problem with delivering such data from the browser application to a service application for use in launching a service application session linked to the authenticated user.

Various embodiments of the disclosure relate to launching an authenticated service application session, such that the session is linked with an authenticated user, by leveraging a browser application to present visual authentication indicia for rendering that may be captured and utilized to launch the authenticated service application session. A browser application is configured to launch a browser sign-in session. During a browser sign-in session, the browser application performs user authentication and presents, to a user device display for rendering, an authentication success interface that includes visual authentication indicia. Embodiments of the present invention capture an authentication success rendering including visual authentication indicia, rendered via a user device display, and in response launch an authenticated service application session. Specifically, some embodiments of the present invention are configured to output a browser session sign-in request that causes a browser application to launch a browser sign-in session, capture an authentication success rendering during the browser sign-in session, parse the authentication success rendering to identify visual authentication indicia, decode the visual authentication indicia to identify user authentication data, and execute a service application sign-in protocol using the user authentication data to launch an authenticated service application session.

Definitions

The term "user" refers to an individual, group of individuals, business, organization, or the like; the users referred to herein may access a service application using a user device or user devices.

The term "user device" refers to any device and/or group of devices configured to access a service application. For example, a user device may include, but is not limited to, a smart phone, tablet computer, laptop computer, desktop computer, personal computer, wearable device, enterprise computer, kiosk, terminal, or the like. A user device may be configured to receive user engagement through a user device display associated with the user device, a set of computer peripherals, such as a mouse, keyboard, microphone, eye tracking device, or the like. Alternatively or additionally, a user device may be configured to receive user engagement through actions performed directly on the user device display, for instance a smartphone configured to detect a user tap, pinch, swipe, or other action associated with the user device display.

The term "user device display" refers to a display configured to render information, visual elements, a graphical user interface, and the like, from a particular user device and/or group of user devices. Specifically, a user device display may be configured to render browser interfaces presented from a browser application, user interfaces associated with a service application, and/or the like. For example, a user device display may include, but is not limited to, a smartphone display, a laptop display, a personal computer monitor, a kiosk display, a monitor, a device screen, or the like. Alternatively or additionally, a user device display may be configured to receive user engagement through actions performed directly on the user device display, such as a smartphone display configured to detect a user tap, pinch, swipe, or other action, and transmit data representing the user engagement to other user device components.

The term "service application" refers to a local software application configured to provide information, transactions, or other services, via a user device. For example, a service application may include, but are not limited to, a smart phone service application, a tablet service application, a laptop service application, a desktop service application, a personal data assistant service application, a kiosk service application, or the like.

The term "service request" refers to an electronically generated request for data, information, transactions, services, or the like, related to a particular service, and is generated by a browser application or a service application associated with the particular service. For example, a service request may include a request to authenticate user authentication credentials with a service application, a request for information associated with a service application, a request to carry out a transaction associated with a service application, or the like.

The term "authentication credentials" refers to any login information, password, identifier, token, and/or the like, or a combination thereof, linked to an authenticated service application user account, that may be used to authenticate a particular user identity. For example, authentication credentials may include, but are not limited to, a username, password, unique identifier, identification number, personal identification number (PIN), token, or the like, as well as any combination therewith.

The term "authentication process" refers to a process for validating received authentication credentials. An example authentication process may include receiving a username and a password, comparing the username and password to entries in a user database, and returning a successful authentication response when the comparison yielding a match in the user database. In some embodiments, an authentication process returns an authenticated service application user account linked to the provided authentication credentials. In some embodiments, an authentication process returns user authentication data, such as an authentication token, associated with received authentication credentials. Other exemplary authentication processes utilize other information useful to identify an authenticated service application user account, such as an access code, unique identifier, PIN, and/or a combination therefrom. In some embodiments, an authentication process may utilize more than one authentication credentials set.

The term "authentication token" refers to data used to verify a user has been authenticated through an authentication process. In some embodiments, an authentication token is used to launch one or more authenticated service application sessions. For example, in some embodiments, an authentication token is created by an application server after a successful authentication process. In some embodiments, an authentication token includes a digital signature, such that the digital signature may be used to verify the authentication token was verified by the application server.

The term "user authentication data" refers to data and instructions used to launch an authenticated service application session. User authentication data may include, but is not limited to, authentication credentials, authentication token(s), one or more cache addresses currently storing authentication data, or the like. User authentication data may verify a user successfully authenticated their identity, for example via a browser application, such that the user authentication data may be trusted without subsequent authentication. In some embodiments, user authentication data is used to associate a particular authenticated service application session with a particular authenticated service application user account.

The term "authenticated service application user account" means a user account registered for use with a service application. An authenticated service application user account corresponds to particular authentication credentials, such that the authentication credentials may be used to identify a particular authenticated service application user account. User authentication data may be associated with an authenticated service application user account such that particular user authentication data may be used to link information, data, service requests, or the like to a corresponding authenticated service application user account.

The term "authenticated access" refers to verified or validated state of secure communication to/from a service application such that information, data, services, or the like associated with service application services that may be engaged, retrieved, or otherwise used associated with an authenticated service application user account. For example, user authentication data associated with an authenticated service application user account may be validated prior to launching an authenticated service application session that facilitates authenticated access to a service application session.

The term "authenticated service application session" refers to a validated service application instance or access period between user device and a service application. The authenticated service application session is defined by a session open, or launch, and a session end. Additionally, an authenticated service application session may be associated with additional session information, such as, but not limited to, a session ID number, a session life time, a session recording time, a session start time, a session end time, a user device identifier, associated user authentication data, and/or an associated authenticated service application user account.

The term "credentials manager" refers to a software and/or hardware module configured to store, retrieve, manage, and/or provide authentication credentials. A credentials manager may be configured to store authentication credentials associated with a particular service application or set of service applications, and provide authentication credentials to such service applications. For example, a credentials manager may be a password manager, single sign-on service, token manager, and/or the like. In some embodiments a credentials manager may be configured to provide a set of authentication user credentials (e.g., username, password, identification number, and/or the like, or any combination thereof) to a browser application, such as during a browser sign-in session. Additionally, a credentials manager may be configured to provide authentication credentials automatically or in response to user engagement.

The term "service application sign-in request" refers to data, instructions, directions, requests, and/or the like, received in response to user engagement with a service application sign-in prompt interface, which causes output of one or more data, instructions, directions, or requests to facilitate launch of an authenticated service application session. Some embodiment systems receive a service application sign-in request in response to user engagement with a service application sign-in prompt interface. Some embodiment systems perform one or more steps in response to receiving the service application sign-in request. For example, some embodiments are configured to, in response to receiving a service application sign-in request, output a browser sign-in session request, initiate capture of a user device display, and/or initiate an abandonment detection module. A service application sign-in request may be one of a plurality of requests, instructions, or directions initiated concurrently, such as in response to a single user engagement, or in response to a single determined and/or automatically occurring event.

The term "service application sign-in prompt interface" refers to a user interface, associated with a service application, which is configured to receive a service application sign-in request. For example, in some embodiments, a service application sign-in prompt interface includes a button configured to receive perform the above in response to user engagement. In some embodiments, a service application sign-in prompt interface is configured to respond to gestures by a user. In some embodiments, a service application sign-in prompt interface is presented for rendering, via a user device display, upon launch of a service application.

The term "visual authentication indicia" refers to any visual element, image, code, graphical user interface component, background, or other marker that encodes user authentication data. In some embodiments, visual authentication indicia is an image using two colors to encode different data values. In some embodiments, visual authentication indicia is a decodable image using two colors nearly indistinguishable to an observing user. In some embodiments, one or more visual authentication indicia portions may be rendered such that the visual authentication indicia is identified using the one or more visual authentication indicia portions. In some embodiments, visual authentication indicia is identified from an animation or video, such that frames of the animation or video are compared to identify the visual authentication indicia.

In some embodiments, visual authentication indicia is rendered via a user device display as part of a user interface. For example, in an example embodiment, an application server generates visual authentication indicia after successfully verifying authentication credentials and identifying corresponding user authentication data. In some embodiments, an application server further generates authentication success interface data configured to cause a browser application to present an authentication success interface that includes the visual authentication indicia. In some embodiments, a display recorder module is configured to capture user device display renderings, parse the user device display rendering to identify the visual authentication indicia, and decode identified visual authentication indicia to identify user authentication data. In some embodiments, an authentication success interface includes multiple instances of visual authentication indicia, for example visual authentication indicia rendered in a repeated manner. In some embodiments, an authentication success interface includes only a single instance of visual authentication indicia.

The term "user device display rendering" refers to a rendering, via a user device display, of a user interface presented by a browser application during a browser sign-in session. In some embodiments, a browser application presents a browser sign-in interface configured to receive authentication credentials. In some embodiments, a browser application presents an authentication success interface using authentication success interface data.

The term "authentication success rendering" refers to a user device display rendering of an authentication success interface that includes visual authentication indicia. The term "authentication success rendering" is utilized to distinguish these renderings from other user device display renderings that do not include visual authentication indicia. In some embodiments, a browser application receives authentication success interface data from an application server and uses the authentication success interface data to configure and/or present an authentication success interface, which includes visual authentication indicia, to a user device display for rendering. After presentation of an authentication success interface including visual authentication indicia, each subsequent rendering may considered an "authentication success rendering." In some embodiments, an authentication success rendering is captured, such as by a display recorder module. In some embodiments, an authentication success rendering is parsed to identify visual authentication indicia included in the authentication success rendering, such as by a recorded authentication module. In some embodiments, multiple authentication success renderings may be captured and/or parsed.

The term "visual indicia type" refers to a layout, visual representation, and/or encoding scheme that may identify a particular instance of visual authentication indicia. For example, a visual indicia type of a given value, for example a string of characters, indicates the visual authentication indicia uses flowers of various colors to encode the user authentication data. In some embodiments, a different value may be used representing a visual indicia type where the visual authentication indicia of that type uses balloons of various colors to encode user authentication data. In some embodiments, another visual indicia type represents visual authentication indicia where an interface border design element utilizing stripes with varying sizes or colors encodes the user authentication data.

The term "visual indicia decoder" refers to an algorithm or set of algorithms to parse an authentication success rendering to identify visual authentication indicia and/or decode visual authentication indicia to identify user authentication data. In some embodiments, a visual indicia decoder is associated with a visual indicia type, such that a visual indicia decoder corresponding to a visual indicia type includes proper algorithms for to parse an authentication success rendering to identify visual authentication indicia of the corresponding visual indicia type and/or decode identified visual authentication indicia of the corresponding visual indicia type. In some embodiments, a generalized visual indicia decoder is utilized such that an authentication success rendering may be parsed to identify visual authentication indicia, and/or the visual authentication indicia decoded to identify user authentication data, regardless of the visual indicia type associated with the visual authentication indicia in the user. Some embodiments identify a visual indicia type associated with an authentication success rendering, for example to subsequently determine an appropriate visual indicia decoder. In some embodiments, a visual indicia decoder is predetermined without identifying a visual indicia type, such as when visual authentication indicia is displayed only in one particular way, making a determination of a visual indicia type unnecessary. For example, an exemplary embodiment always renders visual authentication indicia of a predetermined visual indicia type in one manner, such as integrated into the background of an authentication success interface rendered during a browser sign-in session, thus a predetermined visual indicia decoder is identified by the system upon initiation.

In some embodiments, a software/hardware module, circuitry, and/or the like is configured to operate as a visual indicia decoder by utilizing one or more algorithms to perform parsing and/or decoding. In some embodiments, a visual indicia decoder may utilize algorithms for parsing and/or decoding that are known in the art, for example QR detection algorithms, pattern detection and/or recognition algorithms, image detection and/or recognition algorithms, or the like. In some embodiments, a recorded authentication module is configured to utilize, or operate as, a visual indicia decoder. In some embodiments, a display recorder module is configured to utilize, or operate as, a visual indicia decoder. In some embodiments, a visual indicia decoder is implemented as a standalone software module As used herein, the term "browser sign-in session request" refers to data and instructions that are generated by a service application, or service application module, and are configured to cause a browser application to initiate a browser sign-in session. One example embodiment is configured to output a browser sign-in session request automatically upon launch. Another embodiment is configured to output a browser sign-in session request in response to receiving a service application sign-in request. Another embodiment is configured to output a browser sign-in session request in response to user engagement with a user interface component, such as user engagement with a user interface component of a service application sign-in interface. Some embodiments may be configured to output a plurality of requests in response to a single user engagement, or in response to launch of a service application, where the plurality of requests includes a browser sign-in session. In some embodiments, the plurality of requests additionally includes a request to initiate a display recorder module. In some embodiments, the plurality of requests additionally includes a request to initiate an abandonment detection module.

The term "browser sign-in session" refers to a time period during which a browser application presents, to a user device display for rendering, a series of user interfaces configured to facilitate validation of authentication credentials and display visual authentication indicia. An example browser sign-in session includes a browser application presenting a browser sign-in interface to a user device display for rendering, where the browser sign-in interface is configured to receive user authentication credentials and transmit the authentication credentials to an authentication system or application server. An example browser sign-in session may further include a browser application presenting an authentication success interface to a user device display for rendering, where the authentication success interface includes visual authentication indicia.

In some embodiments, a browser application is configured to, during a browser sign-in session, transmit authentication credentials to an application server, and receive, from an application server, authentication success interface data for use in presenting an authentication success interface including visual authentication indicia. Some embodiments include a module, such as a display recorder module, configured to capture user device display renderings during the browser sign-in session. In some embodiments, a browser sign-in session is associated with a start time and an end time. For example, in some embodiments, a browser sign-in session start time represents a time associated with a browser application requesting a first interface, such as a browser sign-in interface, from an application server corresponding to a service application. In an example embodiment, a browser sign-in session end time represents a time that visual authentication indicia is captured, or an authenticated service application session is launched.

The term "repeated manner" refers to a state of a rendering including visual authentication indicia more than once. For example, in some embodiments, an authentication success rendering may include multiple visual authentication indicia renderings located in distinct portions of the user device display. In some embodiments, a plurality of visual authentication indicia renderings are organized within an authentication success rendering in a pattern. In an exemplary embodiment, an application server is configured to output authentication success interface data that represents an authentication success interface including a plurality of visual authentication indicia in a particular repeated manner, for example arranged exactly side-by-side. In an example embodiment, a display recorder module is configured to capture a user device display having rendered the authentication success rendering, and is configured to parse the authentication success rendering to identify a single visual authentication indicia rendering. In some embodiments, rendering visual authentication indicia in a repeated manner advantageously increases the likelihood of said embodiments identifying visual authentication indicia even when a portion of an authentication success rendering is blocked, such as by another application window rendered on top of the authentication success rendering.

The term "recording time" refers to a length of time since initiation of capture, such as utilizing a display recorder module. For example, in some embodiments a recording time begins once a display recorder is initiated. In some embodiments, a recording time begins once a display recorder module begins capturing a user device display. A recording time may be measured in seconds, milliseconds, frames, or any other unit allowing a determination of time.

The term "timeout value" refers to a length of time after which a user is deemed to have abandoned a browser sign-in session In some embodiments, a timeout value of 30 seconds is associated with the recording time of a display recorder module, such that a user is deemed to have abandoned the session if the system has not launched an authentication service application session within 30 seconds after initiation of a display recorder module. Some embodiments subsequently terminate capture by a display recorder module, or detect a session abandonment event to cause capture to terminate, once a recording time exceeds a corresponding timeout value. In some embodiments, a timeout value is measured in seconds, milliseconds, frames, or any other unit that allows a determination of time. In some embodiments, a timeout value is measured in the same unit used to measure an associated recording time, but a timeout value and recording time need not have the same unit of measurement.

The term "session abandonment event" refers to data, information, and/or the like generated by an abandonment detection module that indicates that a user abandoned a browser sign-in session. Some embodiments of the present invention detect a session abandonment event resulting from user engagement (e.g., a button press, mouse click, or tap on a user device or user device display). Additionally or alternatively, some embodiments of the present invention determine a session abandonment event based upon received, extracted, or otherwise determined information. For example, in some embodiments, a session abandonment event results from user engagement that exits a browser application during a browser sign-in session, such as by closing a browser tab or browser window associated with the browser sign-in session. Alternatively or additionally, some embodiments may determine a session abandonment event when a recording time exceeds a particular timeout value, such as when a display recorder module has been capturing for longer than a corresponding timeout value and no visual authentication indicia has yet been identified. Some embodiments of the present invention are configured to terminate capture by a display recorder module upon determination of a session abandonment event.

Technical Underpinnings and

Implementation of Exemplary Embodiments

A recorded authentication apparatus facilitates the launch of a browser sign-in session, capture of user device display renderings, and launch of an authenticated service application session. Some embodiments facilitate launch of an authenticated service application session through modules configured to capture an authentication success rendering, parse the authentication success rendering to identify visual authentication indicia, decode the visual authentication indicia to identify user authentication data, and execute a service application sign-in protocol using the user authentication data to launch an authenticated service application session.

Given the nature of local applications to, by default, not be compatible to communicate with one another, launching an authenticated service application session after authentication in a browser application may be require communication from another application, thus may be unsecure, may involve a process confusing to the user, or may decrease the efficiency/efficacy of systems for launching such sessions. Some embodiments systems deploy software modules on both a user device (e.g., a service application with various software modules) and an application server (e.g., a remote server with various software modules). In some embodiments, a service application may cause a browser application to facilitate communication between a user device and an application server.

Embodiments of the present invention are configured to output a browser sign-in session request configured to launch a browser sign-in session, initiate a display recorder module to capture user device display renderings, and in response to capturing an authentication success rendering including visual authentication indicia, launch an authenticated service application session. Some embodiments are further configured to render a service application sign-in prompt interface, and receive a service application sign-in request in response to user engagement with the service application sign-in prompt interface. Some embodiments are further configured to receive an authentication request that includes authentication credentials. Some embodiments are further configured to identify user authentication data associated with the authentication credentials, such as through an authentication process, generate the visual authentication indicia, such that the visual authentication indicia encodes the user authentication data, generate an authentication success interface data representing an authentication success interface including at least the visual authentication indicia, and cause a browser application to present the authentication success interface for rendering via the user device display.

Some embodiments are configured to parse a user device display rendering to identify the visual authentication indicia, decode the visual authentication indicia to identify user authentication data, and execute a service application sign-in protocol to launch the authenticated service application session. In some embodiments, the system may include one or more service application server(s) configured to cause the browser application to output various browser interfaces, such as a browser sign-in interface, an authentication success interface, and the like. An authentication success interface may include various interface components such as visual authentication indicia. In some embodiments, visual authentication indicia encodes user authentication data, such as a security/authentication token, that may be used to validate that a user previously successfully authenticated credentials, and/or may be used to launch an authenticated service application session.

Constantly capturing interfaces rendered via a user device display by a browser application during a browser sign-in session allows the system to capture the authentication success rendering upon successful authentication via the browser application without direct communication from the browser application. Subsequently, once an authentication success rendering is captured by an embodiment system, the system may launch an authenticated service application session without any further communication with the browser application. Some embodiments parse the captured data to identify the visual authentication indicia, decode the visual authentication indicia to identify the user authentication data, and utilize the user authentication data to launch an authenticated service application session, for example by executing a service application sign-in protocol utilizing the user authentication data.

Embodiments of the present invention provide many technical advantages. Due to capturing data directly from renderings via a user device display from a browser application, some embodiment systems also are configured to readily identify and decode visual authentication indicia that is nearly indistinguishable to the user. In some embodiments, visual authentication indicia encodes user authentication data using a first color and a second color that are nearly identical to one another, for example only slightly different in terms of red-green-blue (RGB) color value. Such visual authentication indicia that may be unperceivable to a user is readily identifiable by embodiments of the present invention. Furthermore, such embodiments allows visual authentication indicia to be integrated as part of an aesthetically pleasing design, rather than an easily detectable code that uses highly contrasting colors to be detectable using an image detection device, such as a mobile phone camera, to capture through a representation (e.g., the image taken by the mobile phone camera) of the easily detectable code. Additionally, visual authentication indicia may be integrated seamlessly into a visual component of an interface, such as a background of a user interface, border of a user interface component, or the like, and thus visual authentication indicia may be detected without requiring dedicated space to interactable user interface components. Additionally, by capturing data presented directly to a user device display, the data may be analyzed on a highly granular level, for example based on each individual pixel.

Additionally, due to the system parsing, decoding, and capturing the data entirely independently (e.g., without needing to communicate directly with the browser), some embodiment systems facilitate successfully launching an authenticated service application session without any user engagement with an interface component, such as a banner button, displayed as part of a browser interface after the user has successfully authenticated via the browser application. Such embodiments eliminate user confusion that may be associated with prompts and/or accidental user engagement with such interface components by automatically transferring user authentication data from a browser application to a service application through the service application capturing authentication success renderings directly via a user device display.

Additionally, by parsing and decoding data captured by the system itself, some embodiment systems launch authenticated service application sessions in a secure manner without relying on information, messages, or other data sent from the browser application. Additionally, embodiment systems allow a user to sign-in using a browser application and automatically launch an authenticated service application session, thus requiring no further user engagement to launch an authenticated service application session after authenticating via a browser application. Requiring the user only authenticate once improves system efficiency, provides seamless user authentication in a service application, and also eliminates possible user confusion and/or frustration associated with multiple authentications. Additionally, embodiment systems increase security associated with authenticating users by authenticating users on a service application by leveraging a browser application to receive authentication credentials using credentials managers, cookies, or other means of storing authentication credentials, which may prevent cyber-attacks such as key logger attacks. Additionally, facilitating use of a credentials manager may allow users to utilize authentication credentials, such as passwords, with increased complexity, thus increasing overall user security.

System Architecture

Methods, apparatuses, and computer program products of the present invention may be embodied by any of a variety of devices. For example, the method, apparatus, and computer program product of an example embodiment may be embodied by a network device, such as a server or other entity, configured to communicate with one or more devices, such as one or more user devices or one or more developer devices. Example embodiments of the user and developer devices include any of a variety of mobile terminals, such as a portable digital assistant (PDA), mobile telephone, smartphone, laptop computer, tablet computer, or any combination of the aforementioned devices. Additionally or alternatively, the method, apparatus, and computer program product of an example embodiment may be embodied by a service application, such as a service application on a user smartphone, comprising software modules configured to carry out all or some of the operations disclosed herein, and/or interact with a service application server configured to perform all or some of the operations disclosed herein.

In this regard, FIG. 1 is a block diagram showing an exemplary system 100 within which embodiments of the present invention may operate. For example, an exemplary system includes user device 104 including user device display 106. The user device display 106 is configured to render user interfaces presented by user device 104, for example by software applications executed on user device 104. In the illustrated embodiment, user device 104 is configured to interact with recorded authentication system 102. In the illustrated system, user device 104 is also configured to communicate with application server 110 through a network, such as network 108. Application server 110 is configured to communicate with database 112. In some embodiments, application server 110 communicates with database 112 over network 108, over a separate network (not shown), or directly.

In an example embodiment, user device 104 is a smart phone configured to execute one or more software applications, including a browser application and a service application. In other embodiments, user device 104 may be a tablet, personal computer, desktop computer, laptop, kiosk, PDA, or the like.

In the illustrated system, user device 104 is associated with user device display 106. In said embodiment, user device 104 executes software applications, such as a browser application and/or a service application, configured to present interfaces to the user device display 106 for rendering. In some embodiments, user device display 106 is a hardware component connected to user device 104, for example a screen integrated into the user device. In some embodiments, user device display 106 is a monitor or other device connected to user device 104 via an interface provided on user device 104.

Application server 110 is configured to communicate with user device(s), such as user device 104. Application server 110 is configured to receive authentication credentials, validate the authentication credentials, identify user authentication data associated with the authentication credentials, generate visual authentication indicia that encodes the authentication credentials, and generate authentication success interface data configured to represent an authentication success interface including the visual authentication indicia. In some embodiments, the application server 110 is further configured to transmit authentication success interface data to user device 104 to cause a browser application executed on user device 104 to present an authentication success interface including visual authentication indicia for rendering. In some embodiments, application server 110 is configured to generate, retrieve, or receive user authentication data or visual authentication indicia from another system.

Additionally or alternatively, in some embodiments, application server 110 is configured to identify browser sign-in interface data configured to represent a browser sign-in interface configured to receive authentication credentials. In some embodiments, application server 110 transmits the browser sign-in interface data to user device 104 to cause a browser application executed on user device 104 to present a browser sign-in interface for rendering via user device display 106. In some embodiments, application server 110 may otherwise cause a browser application, such as a browser application executed on a user device, to present a browser sign-in interface for rendering.

In some embodiments, application server 110 is configured to function as an authentication system. For example, in the illustrated system, application server 110 is configured to implement an authentication process associated with a particular service. In the illustrated system, application server 110 may implement an authentication process that utilizes information stored in database 112, for example data for determining if authentication credentials received on and transmitted by user device 104 match authentication credentials for previously registered authenticated service application user accounts. Additionally or alternatively, application server 110 may transmit authentication credentials to a third-party device, server, or the like to facilitate an authentication process. After successfully validating authentication credentials, an application server may generate, create, receive, or otherwise user authentication and corresponding identify visual authentication indicia as described above.

Additionally, recorded authentication system 102 may be configured, through hardware and/or software modules, to communicate with hardware and/or software modules of user device 104, and/or communicate with sub-systems or sub-modules of user device 104, such as user device display 106. Accordingly, recorded authentication system 102 may be able to transmit information to, and receive information from, hardware and/or software modules of user device 104, sub-modules of user device 104, such as user device display 106, and/or application server 110, through the hardware and/or software modules of user device 104.

In the illustrated system, user device 104 is configured to communicate with application server 110 through network 108. Network 108 may be the Internet, or the like. User device 104 may be configured to communicate over network 108 using various network interfaces provided on user device 104.

The database 112 may be embodied as a data storage device such as a Network Attached Storage (NAS) device or devices, or a separate database server or servers. The database 112 may include, among other data, user data, authentication credentials for authenticated service application user accounts, browser interface data, such as a browser sign-in interface data and authentication success interface data, or other data. It would be readily appreciated that database 112 may be a single database, multiple databases, or a combination of several components configured for storing information. In some embodiments, each type of data/information stored may be in a separate storage component.

The user device(s) 104 may be embodied by any computing device known in the art. Information received by the recorded authentication system 102 may be provided in various forms and via various methods. For example, the user device 104 may be a laptop computer, personal computer, or the like. In some embodiments, the user device 104 may be smartphone, netbook, tablet computer, wearable device, or the like with functionality allowing capture of the corresponding user device display 106. Information may be provided through various modes of data transmission provided by these consumer devices.

Recorded authentication system 102 is configured to perform operations in accordance with embodiments of the present invention discussed herein. For example, in the illustrated system, recorded authentication system 102 is configured to output a browser sign-in session request configured to launch a browser sign-in session, such as on user device 104 via a browser application executed on user device 104. Additionally, in the illustrated system, recorded authentication system 102 is configured to capture an authentication success rendering via user device display 106, such as an authentication success rendering of an authentication success interface presented by a browser application executed on user device 104. In some embodiments, recorded authentication system 102 may initiate a submodule, such as a display recorder module (not shown), to capture user device display renderings, including an authentication success rendering, via user device display 106. In the illustrated system, recorded authentication system 102 is further configured to, in response to capturing an authentication success rendering comprising visual authentication indicia, launch an authenticated service application session on user device 104.

In some embodiments, recorded authentication system 102 is further configured to parse an authentication success rendering to identify user authentication data. In some embodiments, recorded authentication system 102 is further configured to decode identified visual authentication indicia to identify user authentication data. In some embodiments, recorded authentication system 102 is further configured to execute a service application sign-in protocol to launch an authenticated service application session.

Recorded authentication system 102 may communicate with user device 104 utilizing one or more software modules executed on user device 104, for example as part of a service application. In an exemplary embodiment, recorded authentication system 102 comprises a plurality of software modules executed as a service application on user device 104, wherein the plurality of software modules are configured to perform the operations described herein. In some embodiments, user device 104 may also include a browser application configured to communicate with application server 110 and perform some of the operations described herein.

In some embodiments, user device 104 may share software or hardware components with recorded authentication system 102. In an example embodiment, user device 104 may execute a service application to interact with recorded authentication system 102. Such applications are typically designed to execute on user devices. For example, an application may be provided that executes on device operating systems, for example Apple Inc.'s operating system macOS® or Microsoft Inc.'s Windows®. These platforms typically provide frameworks that allow apps to communicate with one another and with particular hardware and software components of user devices. For example, the operating systems above each provide frameworks for interacting with networking circuitry, such as wired and wireless network interfaces, and frameworks for interacting between applications while preserving privacy and security of individual users. Communicating with hardware and software modules executing outside of the application is typically provided via application programming interfaces (APIs) provided by the user device operating system. Mobile device operating systems that offer similar frameworks, such as frameworks for capturing a user device display, may also be used.

In the case of user device(s) 104, the recorded authentication system 102 may leverage the application framework offered by the operating system of user device 104 to allow users to communicate with software applications, such as a local service application, a browser, and/or other application. Recorded authentication system 102 may be configured to leverage networking capabilities of software or hardware modules associated with user device(s) 104 to communicate with application server 110 through network 108.

For example, user device 104 may be a laptop user device. User device 104 may execute a local service application to interact with recorded authentication system 102. Specifically, for example, a local service application may comprise, or communicate with, a software module implementation of recorded authentication system 102. Recorded authentication system 102 may leverage the operating system of the user device 104, for example a laptop operating system, to communicate with a the local service application, such as to render a user sign-in prompt interface and receive user interaction with said interface. Recorded authentication system 102 may similarly leverage the operating system, in conjunction with other software and/or hardware modules, to communicate with a browser application, such as to transmit a browser sign-in request to the browser configured to launch the browser and cause it to retrieve specific browser sign-in interface data, such as from application server 110, and present a browser sign-in interface for rendering, such as on user device display 106. Recorded authentication system 102 may, independently or together with the local service application, leverage the operating system to initiate a display recorder module to capture a user device display, such as user device display 106. For example, recorded authentication system 102 may initiate a display recorder module to capture user device display 106 during a browser sign-in session.

Figure 2:
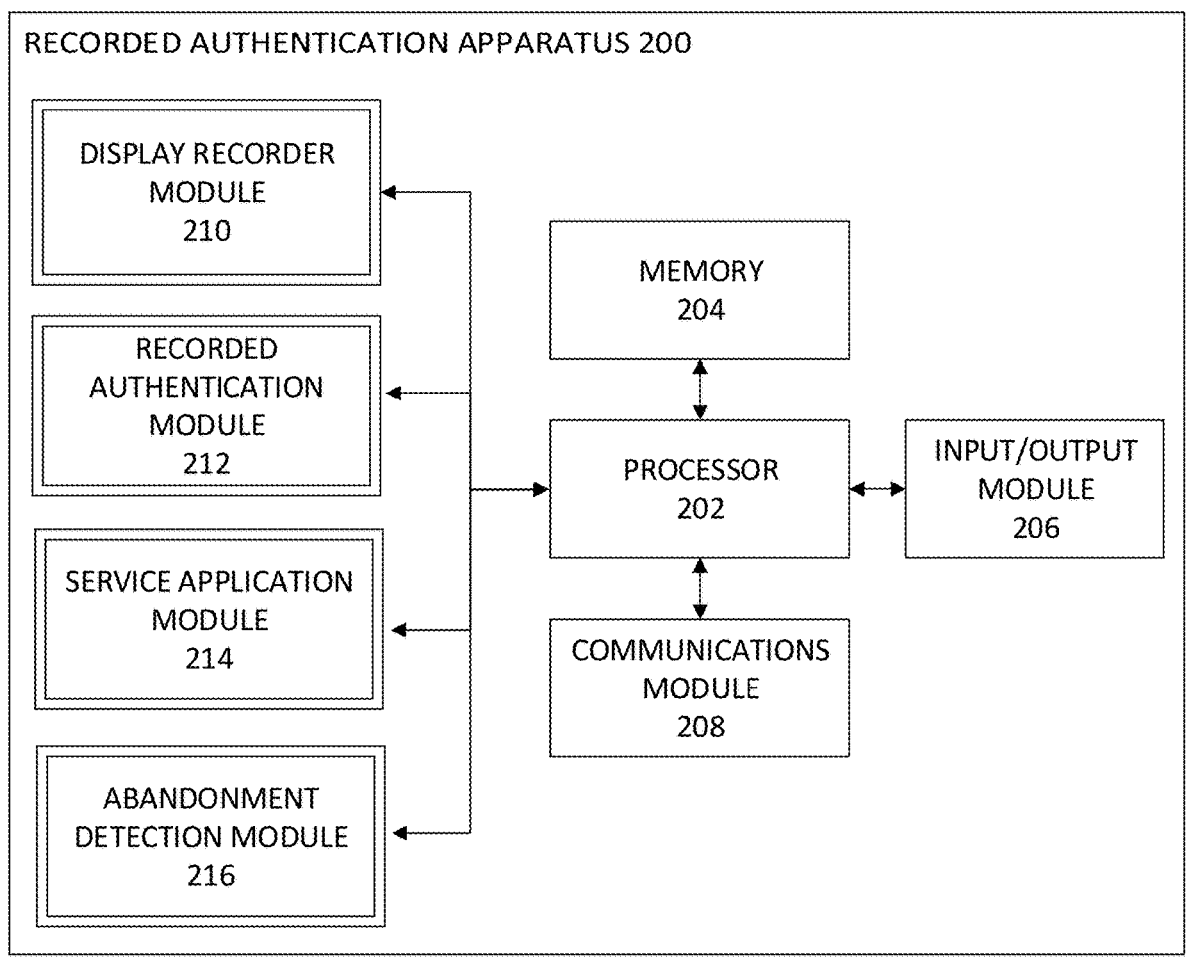
FIG. 2 is a block diagram of an apparatus that may be specifically configured in accordance with an example embodiment of the present invention.

The recorded authentication system 102 may be embodied by one or more computing systems, such as recorded authentication apparatus 200 shown in FIG. 2. As illustrated in FIG. 2, the apparatus 200 may include a processor 202, a memory 204, input/output module 206, communications module 208, display recorder module 210, recorded authentication module 212, service application module 214, and abandonment detection module 216. The apparatus 200 may be configured to execute the operations described above with respect to FIG. 1 and below with respect to FIGS. 3A/3B and 5. Although these components 202-216 are described with respect to functional limitations, it should be understood that the particular implementations necessarily include the user of particular hardware. It should also be understood that certain of these components 202-216 may include similar or common hardware. For example, two modules may both leverage use of the same processor, network interface, storage medium, or the like to perform their associated functions, such that duplicate hardware is not required for each module. The use of the terms "module" and "circuitry" as used herein with respect to components of the apparatus therefore includes particular hardware configured to perform the functions associated with the particular module described herein.

Of course, the terms "module" and "circuitry" should be understood broadly to include hardware, in some embodiments, circuitry may also include software for configuring the hardware. For example, in some embodiments, "module" and/or "circuitry" may include processing circuitry, storage media, network interfaces, input/output devices, and the like. In some embodiments, other elements of the apparatus 200 may provide or supplement the functionality of particular module(s). For example, the processor 202 may provide processing functionality, the memory 204 may provide storage functionality, the communications module 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium.) The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the terms "processing module" and/or "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output module 206 that may, in turn, be in communication with processor 202 to provide output to the user and, in some embodiments, to receive an indication from the user. The input/output module 206 may comprise a user interface and may include a device display, such as a user device display, that may include a web user interface, a mobile application, a client device, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications module 208 may be any means such as a device, module, or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communication network. For example, the communications module 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA) FREC, ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In some embodiments, communications module 208 may facilitate communication between a user device and an application server, such as between user device 104 and application server 110 as illustrated in FIG. 1. For example, communication module 208 may facilitate a user device receiving browser sign-in interface data, transmitting authentication credentials to an application server, and receiving authentication success interface data.

Display recorder module 210 includes hardware components designed to capture, record, or otherwise intake a frame, rendering, or other data associated with a user device display, for example user device display 106 depicted in FIG. 1. Some embodiments may initiate display recorder module 210 once a browser sign-in session request is output. Display recorder module 210, or associated hardware components, may, for instance, utilize input/output module 206 to receive signals and/or data from a user device display (e.g., from user device display 106 associated with user device 104 in FIG. 1, or the like). Display recorder module 210 may utilize a processing module, such as processor 202, to perform the above operations, and may utilize memory 204 to store captured data, images, signals, or the like. It should also be appreciated that, in some embodiments, the display recorder module 210 may include a separate processor, specially configured field programmable gate array (FPGA), or application specific interface circuit (ASIC) to perform the above functions.

Recorded authentication module 212 includes hardware components configured to, in response to capturing an authentication success rendering, launch an authenticated service application session. In some embodiments, recorded authentication module 212 includes hardware components designed to parse a captured authenticated success rendering to identify visual authentication indicia. In some embodiments, recorded authentication module 212 includes hardware components designed to decode identified visual authentication indicia to identify user authentication data. In some embodiments, recorded authentication module 212 includes hardware components designed to execute a service application sign-in protocol to launch an authenticated service application session. In some embodiments, recorded authentication module 212 includes hardware components designed to identify a visual indicia type associated with visual authentication indicia included in an authentication success rendering. In some embodiments, recorded authentication module 212 includes hardware components designed to identify a visual indicia decoder for use in parsing captured data and/or decoding identified visual authentication indicia.

Recorded authentication module 212 may, for instance, utilize a processing module, such as processor 202 to perform the above operations, and may utilize a memory module, such as memory 204, together with a processing module, such as processor 202, to retrieve capture data and/or store data parsed and/or decoded from capture data, or similar data useful for performing such operations. Additionally or alternatively, recorded authentication module may utilize a processing module, such as processor 202, in conjunction with display recorder module 210 to retrieve capture data associated with user device display renderings, such as authentication success renderings including visual authentication indicia, which may then be parsed and/or decoded as described. It should also be appreciated that, in some embodiments, the recorded authentication module 212 may include a separate processor, specially configured field programmable gate array (FPGA), or application specific interface circuit (ASIC) to perform the above functions.

Service application module 214 includes hardware components designed to communicate with other applications and/or apparatuses, for example to communicate with a browser application. In some embodiments, service application module 214 includes hardware components designed to output a browser sign-in session request configured to launch a browser sign-in session, such as on a browser application. In some embodiments, service application module 214 may output requests as well to submodules of the apparatus 200, such as to initiate capture by display recorder module 210. In some embodiments, service application module 214 includes hardware components designed to present a service application sign-in prompt interface for rendering via a user device display. Service application module 214 may include hardware components designed to receive a service application sign-in request, for example in response to user engagement with a presented service application sign-in prompt interface. Service application module 214 may, for instance, utilize a processing module, such as processor 202, to perform the above operations, and may further utilize any of the other modules, such as communications module 208, for their purposes as described herein to perform the above operations. It should be appreciated that, in some embodiments, the service application module 214 may include a separate processor, specially configured field programmable gate array (FPGA), or application specific interface circuit (ASIC) to perform the above functions.

Abandonment detection module 216 includes hardware components designed to determine, receive, and/or detect session abandonment events. In some embodiments, abandonment detection module 216 may facilitate communication of data between various software and/or hardware modules, such as display recorder module 210, recorded authentication module 212, service application module 214, input/output module 206, communications module 208, and the like, to facilitate detection of session abandonment events using data captured, received, transmitted, or otherwise communicated using these modules. For example, in some embodiments, abandonment detection module 216 includes hardware components designed to identify a timeout value, track a recording time, identify if a recording time exceeds timeout value, and if the recording time does exceed the timeout value, terminate capture of the user device display. Additionally or alternatively, abandonment detection module 216 may be configured to detect signals or data indicative of a session abandonment event, for example a closing of a browser tab associated with a browser sign-in session using data from another module described above. Abandonment detection module 216 may, for instance, utilize a processing module, such as processor 202, to perform the above operations, input/output module to detect data rendered to a user device display/receive user engagement data, service application module 214 to detect session abandonment events in data communicated between application modules, and the like. It should be appreciated that, in some embodiments, the abandonment detection module 216 may include a separate processor, specially configured field programmable gate array (FPGA), or application specific interface circuit (ASIC) to perform the above functions.

As will be appreciated, any such computer program instructions and/or other type of code may be loaded onto a computer, processor, or other programmable apparatus' circuitry to produce a machine, such that the computer, processor, or other programmable circuitry that executes the code on the machine creates the means for implementing various functions, including those described herein.

As described above and as will be appreciated based on this disclosure, embodiments of the present invention may be configured as systems, methods, mobile devices executing software applications, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The user device 104 may be embodied by one or more computing systems that also may include a processor, a memory, an input/output module, and a communications module. As it relates to operations described in the present invention, the functioning of these components may be similar to the similarly named components described above with respect to FIG. 2, and for the sake of brevity, additional description of the mechanics of these components is omitted. Nevertheless, these devices elements, operating together, provide the respective apparatuses with the functionality necessary to facilitate the communication of data (e.g., capture, storage, analysis, or like, of user device display data, such as user device display renderings, or similar data) with the recorded authentication system, such as recorded authentication system 102.

Having described specific components of example devices involved in the present invention, an example data flow for a system in which example embodiments of the present invention may operate is described below in connection with FIG. 3A and FIG. 3B.

Example System Data Flow

Figure 3A:
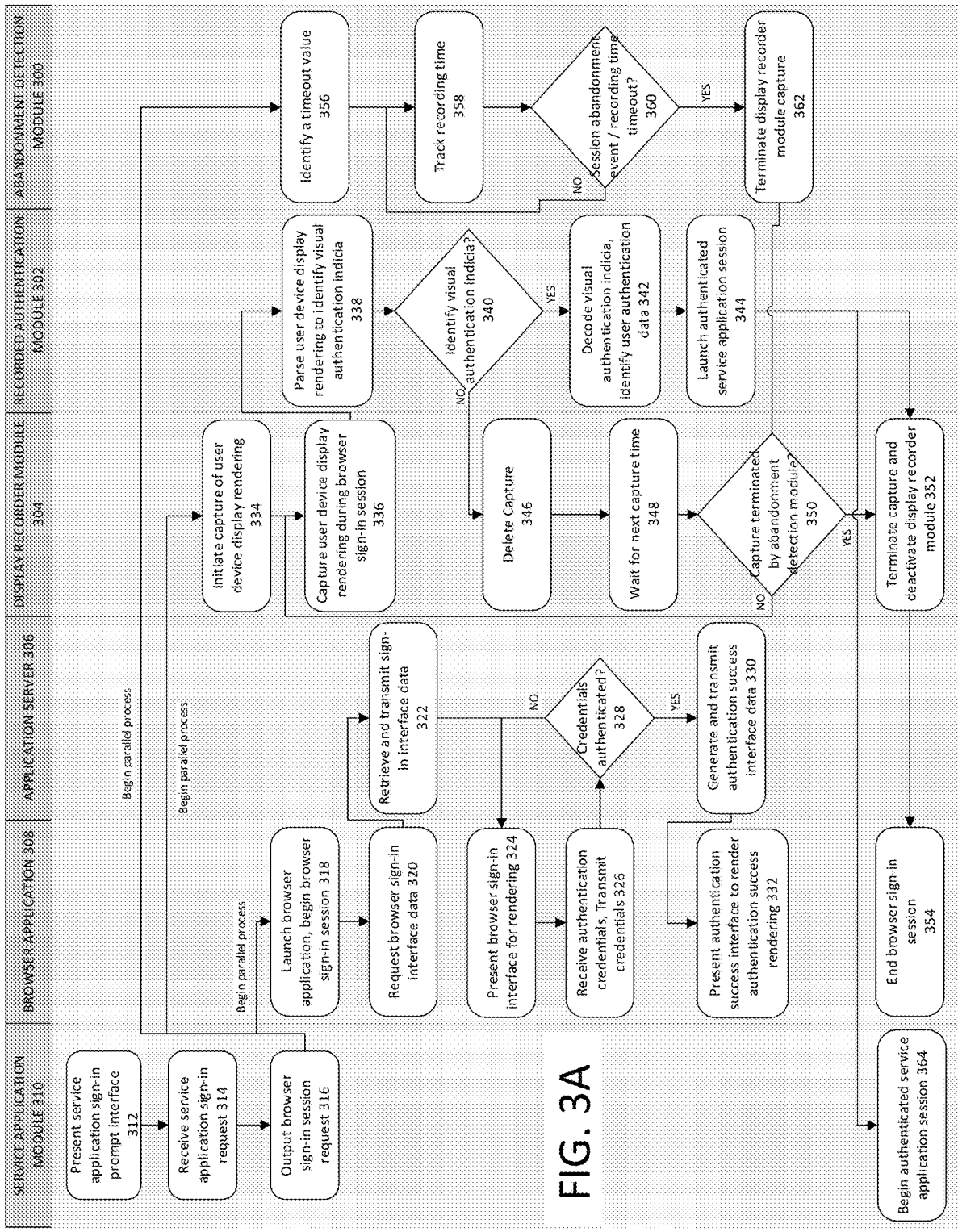
FIGS. 3A and 3B illustrate operation flow diagrams depicting operational steps configured in accordance with an example embodiment of the present invention.

Turning to FIGS. 3A/3B, a data flow diagram is illustrated that contains operations in which embodiments of the present invention may operate. Operations in FIG. 3A/B may, for example, be performed by a system comprising abandonment detection module 300, recorded authentication module 302, display recorder module 304, application server 306, browser application 308, and service application module 310. An exemplary system may include a user device, such as user device 104, configured to execute service a service application comprising service application module 310, display recorder module 304, recorded authentication module 302, and abandonment detection module 300. In said example system, the user device may also be configured to execute browser application configured to perform the operations of browser application 308. Application server 306 may be a hardware/software module executed on a server, such as application server 110 depicted in FIG. 1. Similarly, the user device may be configured to communicate with application server 306 through one of the hardware/software modules described above, or through alternative hardware/software modules. As will be appreciated in light of the disclosure herein, in some embodiments, multiple modules 302-310 may be controlled by a single module configured to perform the operations of the multiple modules. For example, in an example embodiment, a single software application executed on a user device is configured to perform the operations of modules 310, 304, 302, and 300. By way of example, FIG. 3A will be discussed according to the operations performed by a specific system containing a specific user device and a specific applications server, with specific modules therein. It will be understood, however, that these operations may be applied for any combination of user device and server for performing the operations depicted.

At step 312, a service application module 310 presents a service application sign-in prompt interface. The service application module 310 may present the service application sign-in prompt interface to a user device display for rendering. In some embodiments, the service application sign-in interface includes a button that a user may engage with. In some embodiments, the service application sign-in interface may receive user engagement through other means, such as a gesture. The user device display may then, in step 312, render the service application sign-in prompt interface.

At step 314, the service application module 310 receives a service application sign-in request. In some embodiments, the service application sign-in request is received in response to user engagement with a component of the service application sign-in prompt interface, for example a button. Alternatively, in some embodiments, the service application sign-in request is received in response to user engagement such as a gesture.

At step 316, service application module 310 is configured to output a browser sign-in session request. In some embodiments, the browser sign-in session request is configured to launch a browser sign-in session. For example, an example embodiment may output a browser sign-in session request to a browser application executed on a user device.

As illustrated, multiple processes operate in parallel after step 316. For example, as illustrated and described in detail below, in some embodiments steps 318, 334, and 356 begin parallel processes that utilize steps 318-364. Accordingly, in an example embodiment, the service application module 310 performs steps 312-316 first, before execution of the remaining steps.

In some embodiments, steps 312 and 314 may be eliminated. Accordingly, some embodiments may immediately output a browser sign-in session request, for example when a service application is launched, to decrease the time necessary for a user to authenticate through a browser. However, in some embodiments, steps 312 and 314 may be included to facilitate a desired user experience.

At step 318, browser application 308 is launched and a browser sign-in session begins. The browser sign-in session request output at step 316 may cause browser application 308 to launch and begin the browser sign-in session. For example, in some embodiments, the browser sign-in session request includes a URI, and browser application 308 is configured to launch after receiving the browser sign-in session request including the URI.

At step 320, browser application 308 requests browser sign-in interface data. Browser application 308 may transmit a request for browser sign-in interface data to application server 306. For example, in some embodiments, the browser application 308 accesses, immediately after launch, a Uniform Resource Identifier (URI) included in the browser sign-in session request, which causes transmission of a request for sign-in interface data to application server 306.

At step 322, application server 306 retrieves and transmits sign-in interface data to browser application 308. In some embodiments, application server 306 retrieves sign-in interface data from a database associated with the application server 306, for example database 112 illustrated in FIG. 1. The browser sign-in interface data represents a browser sign-in interface configured to receive authentication credentials from a user. Application server 306 may retrieve the browser sign-in interface data from a database and transmit it as a response to the browser application 308.

At step 324, browser application 308 presents a browser sign-in interface for rendering, such as via a user device display. In some embodiments, the browser application 308 may utilize the browser sign-in interface data transmitted from application server 306 in step 322 to configure the browser sign-in interface. In some embodiments, the browser sign-in interface includes one or more input components configured to receive authentication credentials. In some embodiments, the input components may be configured to respond to user engagement, for example a user typing their username and/or password.

At step 326, the browser application 308 receives authentication credentials via the browser sig-in interface and transmits the authentication credentials to application server 306. In some embodiments, the browser application 308 receives authentication credentials through user engagement with input components of the browser sign-in interface. In some embodiments, the browser application 308 is configured to receive input via a credentials manager. For example, a browser application 308 may communicate with a password manager, such that the password manager inputs the user's authentication credentials without requiring the user manually input the authentication credentials. In some embodiments, credentials managers may leverage single sign on, or other methods of securely managing authentication credentials.

At step 328, the application server 306 authenticates the received authentication credentials. In some embodiments, application server 306 is configured to perform an authentication process. For example, application server 306 may compare the input authentication credentials set with authentication credentials stored in a user database. If the input authentication credentials set is a match with authentication credentials stored in the user database, the application server may identify the match and authenticate the user. In some embodiments, application server 306 may communicate with a third-party authentication system to perform the authentication process. If the application server 306 fails to authenticate the input authentication credentials at step 328, flow returns to step 324 and the browser application 308 again presents a browser sign-in interface for rendering, wherein the browser sign-in interfaces is configured to receive a new set of authentication credentials. If the application server 306 does authenticate the input authentication credentials, flow continues to step 330.

At step 330, the application server 306 generates and transmits authentication success interface data. In some embodiments, at step 330, application server 306 generates, receives, or otherwise identifies user authentication data. User authentication may be used to verify that the application server 306 successfully authenticated the input authentication credentials. For example, application server 306 may receive or generate user authentication data that is an authentication/security token intended to allow the browser application 308 to utilize the token to transmit information requests. In some embodiments, at step 330, application server 306 then generates visual authentication indicia encoding the user authentication data. Continuing the authentication token example, application server 306 may utilize an encoding algorithm to visually encode the authentication token into visual authentication indicia. Subsequently, in some embodiments, application server 306 generates authentication success interface data. In some embodiments, application server 306 retrieves the authentication success interface data from a database that stores interface data. In some embodiments, application server 306 includes data representing the visual authentication indicia in the authentication success interface data, such that the authentication success interface represented by the authentication success interface data includes one or more instance of the visual authentication indicia. Once the authentication success interface data is configured to represent an authentication success interface that includes visual authentication indicia, the authentication success interface data is transmitted to browser application 308.

At step 332, the browser application 308 presents an authentication success interface for rendering via a user device display. Browser application 308 may configure the authentication success interface using the authentication success interface data transmitted to the browser application 308 in step 330. Subsequently, in some embodiments, browser application 308 presents an authentication success interface, including the visual authentication indicia identified at step 330, for rendering by a user device display. The rendering of this interface by a user device display may be referred to as an "authentication success rendering," as it includes the visual authentication indicia. In some embodiments, the authentication success rendering includes visual authentication indicia integrated into the background of the authentication success interface.

At step 334, display recorder module 304 is initiated and begins capturing user device display renderings. In some embodiments, step 334 may occur directly before, directly after, or concurrently with step 318, such that the display recorder module 304 may begin capture after, or in response to, output of a browser sign-in session request. Accordingly, steps 336 through 350 may occur concurrently, in parallel with steps 318 through 332.

At step 336, display recorder module 304 captures a user device display rendering during a browser sign-in session. The user device display rendering captured at step 336 may be a particular rendering of the browser sign-in interface presented at step 324, or a particular rendering of the authentication success interface presented at step 332. In embodiments where other interfaces are displayed in steps 320 through 332, those interfaces may be captured as well. In some embodiments, display recorder module 304 is configured to capture multiple renderings, for example when an authentication success interface contains an animation, video, or the like, wherein visual authentication indicia may be parsed based on multiple captures of the animation, video, or the like. In an example embodiment, display recorder module 304 captures a first authentication success rendering including a second visual authentication indicia rendering and a second authentication success rendering including a second visual authentication indicia rendering, for example when an interface includes an animation. Visual authentication indicia that may be identified using the first visual authentication indicia rendering and the second visual authentication indicia rendering, such as by comparing pixel values between the two.

At step 338, recorded authentication module 302 parses the captured user device display rendering to identify visual authentication indicia. Recorded authentication module 302 may utilize a series of algorithms to parse the captured user device display rendering and identify visual authentication indicia, for example pattern detection algorithms. In some embodiments, recorded authentication module 302 predetermines a visual indicia type associated with expected visual authentication indicia in a particular authentication success rendering. In some embodiments, recorded authentication module 302 identifies a visual indicia decoder to utilize in parsing to identify and/or decoding visual authentication indicia.

At decision step 340, recorded authentication module 302 determines if visual authentication indicia was identified. Visual authentication indicia is identified only if the corresponding user device display rendering is an authentication success rendering, which includes visual authentication indicia. In the depicted illustration, an authentication success rendering is not rendered until step 332, which is after a user successfully authenticates and a corresponding interface is displayed, as described above. Accordingly, decision step 340 will result in "NO" until step 332 is reached in the parallel flow of steps 318-332.

If recorded authentication module 302 could not identify visual authentication indicia at step 338, flow continues to step 346. At step 346, display recorder module 304 deletes the captured user device display rendering captured at step 336. Embodiments that delete the captured user device display renderings that do not include visual authentication indicia increase system privacy by preventing accidental exposure of other user data, for example personal identifying information, captured instead of the desired authentication success rendering. For example, a user may have initiated the browser sign-in session at step 318, and then decided to log into an online banking website. Accordingly, a browser may present a banking interface for render via a user device display, and that banking interface may be captured in a user device display rendering at step 336. If important information is captured, such as banking credentials, privacy is enhanced by embodiments that delete the captured user device display rendering immediately at step 346 after failing to identify visual authentication indicia in the user device display rendering, rather than caching or storing the captured user device display rendering. Some embodiments may cache or store a captured user device display rendering to facilitate methods of decoding visual authentication indicia that utilize more than one rendering. For example, when visual authentication indicia encodes user authentication indicia using two frames of an animation.

At step 348, display recorder module 304 waits for the next capture time. In some embodiments, display recorder module 304 captures continuously, such that the display recorder module 304 captures another user device display rendering immediately after deleting the previous capture. In some embodiments, display recorder module 304 may capture at a defined capture rate. For example, some embodiments capture at a rate of 60 captures per second. Alternatively, some embodiments capture at a rate of 2 captures per second, or every half-second. Embodiments of the present invention may capture at any capture rate. However, a lower capture rate may be decrease the processing capabilities required by the system.

At step 350, the display recorder module determines if capture has been terminated by the abandonment detection module 300. If capture has not been terminated, flow returns to step 336, and another user device display rendering is captured. Capture termination by abandonment detection module 300 is discussed in greater detail below.

Returning to decision step 340, if visual authentication indicia was identified, flow continues to step 342. User device display renderings including visual authentication indicia may be referred to as "authentication success renderings," to differentiate these renderings from other renderings captured during the browser sign-in session. The recorded authentication module 302 would identify visual authentication indicia, and thus continue to step 342, once the browser application 308 presents the authentication success interface for rendering at step 332, such that the user device display renders an authentication success rendering. Before browser application 308 reaches step 332, the display recorder module 304 and recorded authentication module 302 may continue to perform steps 336, 338, 346, and 348.

At step 342, recorded authentication module 302 decodes the identified visual authentication indicia to identify user authentication data. In some embodiments, recorded authentication module 302 identifies a visual indicia decoder to utilize in decoding step 342. Alternatively, in some embodiments, a visual indicia decoder is identified in an earlier step, such as at step 334, and utilized in decoding step 342. At step 342, a series of algorithms may be performed to identify the user authentication indicia. Furthermore, some embodiments may identify the visual authentication indicia using multiple visual authentication indicia renderings, for example a first visual indicia rendering and the second visual indicia rendering, such as by comparing pixel values between renderings to identify the visual authentication indicia.

At step 344, recorded authentication module 302 is configured to launch an authenticated service application session. In some embodiments, recorded authentication module 302 utilizes the user authentication data identified in step 342 to launch the authenticated service application session. For example, in some embodiments, recorded authentication module 302 executes a service application sign-in protocol using the user authentication data to launch the authenticated service application session. In some embodiments, recorded authentication module 302 may launch an authenticated service application session linked to the user authentication data such that service requests made during the authenticated service application session are associated with an authenticated service application user account using the user authentication data.

At step 356, abandonment detection module 300 is initiated and identifies a timeout value. In some embodiments, step 356 may occur directly before, directly after, or concurrently with steps 318 and/or 334, such that the abandonment detection module 300 initiate after, or in response to, output of a browser sign-in session request. Accordingly, steps 356-362 may occur concurrently, in parallel with steps 318-332, and steps 336-354.

At step 356, a timeout value is identified. In some embodiments, the timeout value is predetermined and identified upon initiation of the abandonment detection module 300. In a particular embodiment, a timeout value of 30 seconds may be used, such that the user is considered to have abandoned the browser sign-in session if no authenticated service application session is launched within 30 seconds of a browser sign-in session start time.

At step 358, abandonment detection module 300 may track a recording time. In some embodiments, steps 356 and 318 occur concurrently, thus the recording time represents time since initiation of the display recorder module 304 and the abandonment detection module 300. In some embodiments, abandonment detection module 300 requests the running time from display recorder module 304. In some embodiments, abandonment detection module 300 first determines or requests an initiation time since initiation of the display recorder module 304, and at each step 358 determines the time since the initiation time.

At decision step 360, abandonment detection module 300 determines if a session abandonment event occurred or the recording time exceeds the timeout value. In some embodiments, abandonment detection module 300 may be configured to determine session abandonment events that occur during the browser sign-in session. For example, abandonment detection module 300 may detect a session abandonment event when a user closes a browser application, browser application tab, or browser application window associated with a browser sign-in session. In the above example where a timeout value of 30 seconds is identified, the abandonment detection module 300 may identify the running time exceeds the timeout value by comparing the timeout value and running time at decision 360.

If no session abandonment event or timeout is detected at decision 360, flow returns to step 358. In some embodiments, when flow returns to step 358, the abandonment detection module updates the running time.

If a session abandonment event or timeout is detected at decision 360, abandonment detection module 300 terminates capture by display recorder module 304. In some embodiments, abandonment detection module 300 transmits a capture termination request to display recorder module 304. In some embodiments, abandonment detection module 300 disables or otherwise de-initializes display recorder module 304. Various other methods may be used to terminate capture by display recorder module 304.

If capture by display recorder module 304 is terminated, such as through a capture termination request sent to display recorder module 304, the display recorder module 304 will continue flow to step 352. Accordingly, at step 352, display recorder module 304 terminates capture and deactivates display recorder module 304. At step 352, no user device display renderings will be further captured until the display recorder module is reinitialized. For example, capture may be terminated until a new service application sign-in request is received, such as via an application sign-in prompt interface at step 314.

In an exemplary flow, an authentication success interface will be presented at step 332. Subsequently, a user device display rendering including visual authentication data (i.e., an exemplary authentication success rendering) will be captured at step 336. Subsequently the captured authentication success rendering is parsed to identify visual authentication indicia at step 338, the visual authentication is decoded to identify user authentication data at step 342, and an authenticated service application session is launched at step 344.

Two parallel flows may operate after step 344. For example, as illustrated, flow may continue to step 364, where an authenticated service application session begins. In an example embodiment, after the authenticated service application session is launched at step 344, the user may access the authenticated service application. For example, during the authenticated service application session that begins at step 364, a user may submit one or more service requests. The authenticated service application session that begins at step 364 may continue until a user terminates the authentication service application session, for example by signing out or terminating the service application process.

After step 344, flow may also continue, in parallel, to step 352, where capture is terminated and the display recorder module 304 deactivated. In some embodiments, recorded authentication module 302 transmits a message to display recorder module 304 indicating successful launch of an authenticated service application session, and the display recorder module terminates in response to the message. Alternatively, recorded authentication module 302 and display recorder module 304 may communicate directly, such that recorded authentication module 302 is configured to terminate or deactivate display recorder module 304 directly.

Finally, at step 354, the browser sign-in session ends. In some embodiments, browser application 308 terminates at or after step 354. In some embodiments, browser application 308 remains active and an authenticated browser session begins.

In the steps above, transmissions to/from the application server 306 may take place over a network similar to network 108 as depicted in FIG. 1.

As depicted in FIG. 3A, multiple processes are performed in parallel after step 316. A specific instance of these parallel processes is illustrated in FIG. 3B. As illustrated in FIG. 3B, steps 318-332 describe a user authentication process, steps 334-354 define an authenticated recording process, and steps 356-362 describe an abandonment detection process. Each of these processes operates in parallel with the others until one of the processes. Flow stops, in some embodiments for example, by any of the parallel processes reaching step 352, such as through successful launch of an authenticated service application session after a user authenticates via a browser application, or after termination of capture due to a session abandonment event or timeout. For illustrative purposes, markers have been included that indicate the passage of time, specifically markers for TIME 0, TIME 1, TIME 2, and TIME 3.

Figure 3B:
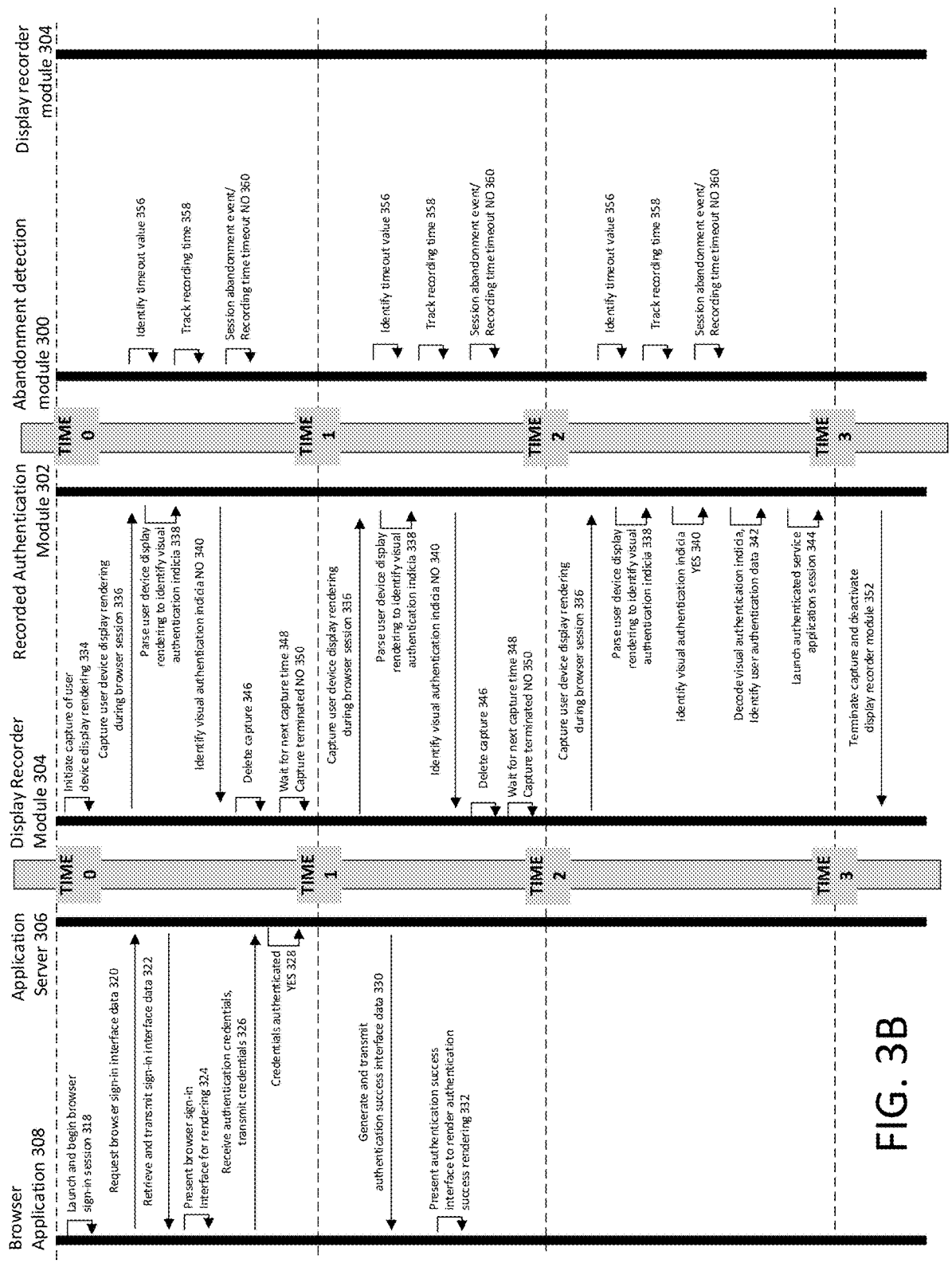

As illustrated in FIG. 3B, the authenticated recording process defined by steps 334-354 is performed twice. This is because, at decision step 340, the NO branch is taken until a user device display rendering is captured, at step 336, after the authentication success interface is presented at step 332 in a parallel process. Accordingly, at TIME 0, the first captured user device display rendering does not include visual authentication indicia because the user authentication process has not reached step 332. The same occurs when the authenticated recording process restarts at TIME 1, and once again does not capture an authentication success rendering that includes visual authentication indicia.

However, at the next capture after TIME 2, the parallel process has reached step 332, and thus the user device display rendering captured at step 336 after TIME 2 is an authentication success rendering that includes visual authentication indicia. Accordingly, this flow continues down the YES branch of decision 340, and eventually reaches block step.

In the specific flow depicted in FIG. 3B, no session abandonment event or recording time timeout is detected. Thus, while the abandonment detection module continues to perform steps 356-360 in parallel with the other processes, no communications are ever sent to another module.

FIG. 4A illustrates a flow chart depicting exemplary operations performed by a module, such as a service application module, in accordance with an example embodiment of the present invention. At block 402, the embodiment service application module may present an application sign-in prompt interface for rendering, for example via a user device display. In some embodiments the application sign-in prompt interface may be configured to, in response to user engagement with the interface, output an application sign-in request. In some embodiments, the application sign-in prompt interface may include one or more user interface components such as buttons, links, or the like. At block 404, embodiment service application module receives the service application sign-in request. In some embodiments, the embodiment service application module may receive the service applications sign-in request in response to user engagement with the application sign-in prompt interface presented at block 402. Alternatively or additionally, in some embodiments, the embodiment service application module may receive the service application sign-in request automatically. For example, if a service application is launched and a service application has not previously authenticated the user, the service application may be configured to automatically receive the service application sign-in request. Alternatively or additionally, some embodiment service application modules may begin at block 406.

At block 406, the service application module outputs a browser sign-in session request. In some embodiments, the browser sign-in session request may be output using another module of the user device, an operating system, or the like, to cause the browser to launch and request browser sign-in interface data. At block 408, an exemplary service application module may initiate another module, such as a display recorder module or recorded authentication module, to capture user device display renderings, including an authentication success rendering. In some embodiments, an exemplary service application module may be configured to directly initiate the display recorder module. Alternatively, in some embodiments, a service application module may transmit a request to initiate the display recorder module. Blocks 406 and 408 may be performed concurrently, and/or immediately after one another, in response to the service application sign-in request received at block 404.

Decision 410 may be performed by an application service module or a browser application. In either case, at decision 410, an example embodiment determines or causes determination of whether a user has already authenticated their authentication credentials through the browser applications.

If the user has not already authenticated their authentication credentials through the browser application, flow proceeds to block A in FIG. 4B. FIG. 4B illustrates steps performed by an application server or associated module.

At block 412, the application server identifies browser sign-in interface data. Browser sign-in interface data represents a browser sign-in interface configured to receive authentication credentials. In some embodiments, the application server identifies browser sign-in interface data that represents a stored browser sign-in interface corresponding to a particular requested URI.

At block 414, an application server is configured to cause a browser application to present a browser sign-in interface for rendering. For example, a service application may transmit the browser sign-in interface data to user device such that a browser application executed on the user device configures the browser sign-in interface using the transmitted browser sign-in interface data and subsequently presents the browser sign-in interface for rendering via a user device display. In some embodiments, the browser sign-in interface data may cause the corresponding browser sign-in interface to be configured to receive authentication credentials through a credentials manager. For example, in some embodiments, the credentials manager may be a password manager, a single-sign on operator (such as Facebook single-sign on or the like), a token manager, or the like. At block 416, the application server receives the authentication credentials from the browser application. A browser application may transmit, using networking interfaces associated with a user device on which the browser application is executed, authentication credentials to the application server over a network.

At decision 418, the application server verifies/authenticates the authentication credentials. For example the application server may verify the authentication credentials using an authentication process as described above. Alternatively, the application server may communicate with a third-party authentication system that verifies the authentication credentials. If the received authentication credentials are not verified, the application server may cause the browser application to configure the browser sign-in interface to receive new authentication credentials. For example, the application server may send a response that causes the browser application to clear input fields and display a message indicating that authentication was not successful. Alternatively, the application server may send a response that causes the browser application to present a new or different browser sign-in interface.

If authentication is successful, flow continues to block 422. At block 422, the application server identifies user authentication data using the received authentication credentials. For example, an exemplary application server may generate, receive, or retrieve an authentication/security token associated with the received authentication credentials. In some embodiments, the application server may store user authentication data in a database associated with the application server and retrieve it at block 422.

At block 424, the application server generates visual authentication indicia using the identified user authentication data. In some embodiments, the application server may transmit the identified user authentication data to another system or module and receive, as a response, visual authentication indicia. Alternatively or additionally, in some embodiments, the application server may utilize one or more algorithms to encode the user authentication data into visual authentication indicia. In some embodiments, the visual authentication indicia generated may be a visual code using two colors to encode different data values. In some embodiments, visual authentication indicia may be an image using flowers of different colors to encode different data values. In some embodiments, visual authentication indicia may be an image where bars of different length encode different data values. In some embodiments, visual authentication indicia may be an image where bars of different width encode different data values. In some embodiments, an animation of two or more frames may be used to encode different data values, such as by comparing the color values of each pixel in the animation between the two frames.

At block 426, the application server generates authentication success interface data comprising the visual authentication indicia generated at block 424. In some embodiments, the application server may identify shell interface data, for example shell interface data representing a default interface, and insert data representing the visual authentication indicia into the shell interface data to create the authentication success interface data. The generated authentication success interface data represents an authentication success interface including the visual authentication indicia, such that a browser application may present the authentication success interface for rendering via a user device display. At block 428, the application server transmits the authentication success interface data to the browser application. In some examples, the transmitted authentication success interface data causes the browser application to present an authentication success interface for rendering. For example, the application server may transmit a response message including the authentication success interface to a user device on which the browser application is executed.

Figure 4C:
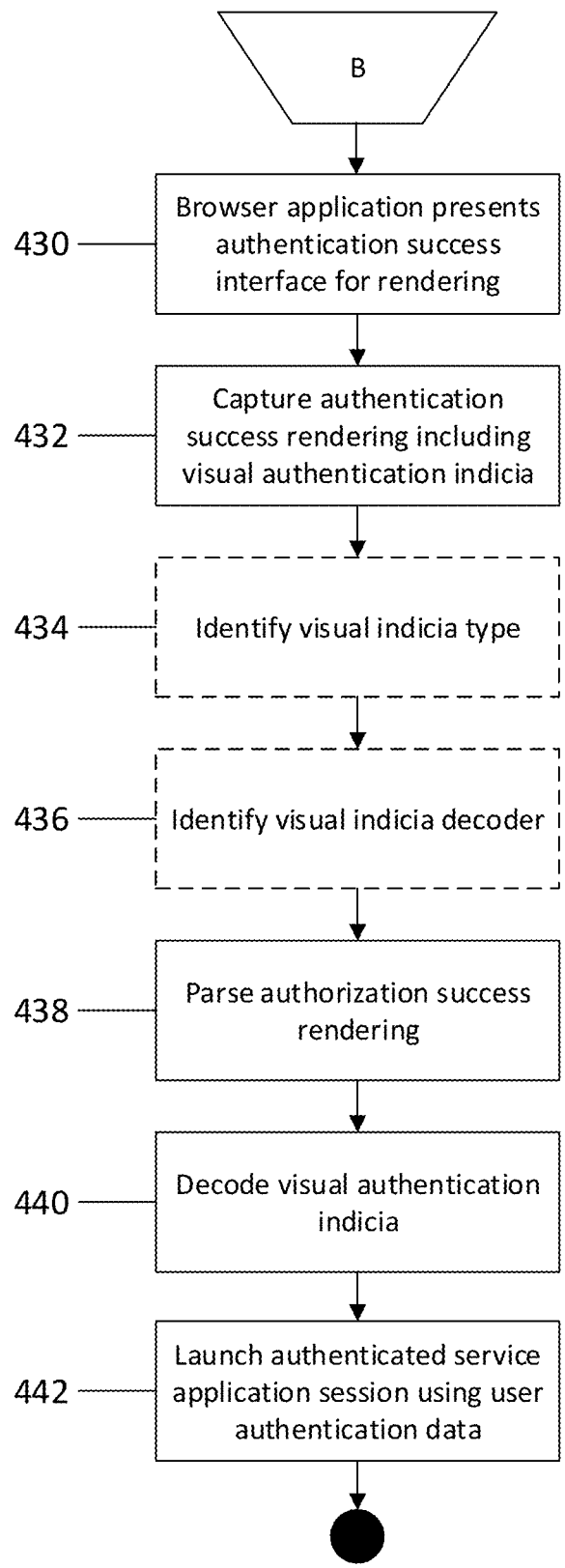
FIG. 4C illustrate a flowchart depicting various operations performed by one or more modules in accordance with an example embodiment of the present invention.

Flow then proceeds to block B in FIG. 4C. FIG. 4C illustrates a flow chart depicting exemplary operations performed in accordance with an example embodiment of the present invention. In some embodiments, one or more of the blocks depicted in FIG. 4C are performed by multiple modules. For example, a browser application and/or associated module may perform block 430, a display recorder module may perform block 432, and a recorded authentication module associated with the display recorder module may perform blocks 434-442. In an example embodiment, a single module may perform all of the blocks 432-442.

At block 430, the browser application presents the authentication success interface for rendering, such as via a user device display. The authentication success interface includes visual authentication indicia. In some embodiments, if flow proceeds to block 430 from FIG. 4B, the browser application may configure an authentication success interface using the authentication success interface data transmitted at block 428, and subsequently present the authentication success interface for rendering via a user device display.

Alternatively, returning to decision 410, if the user authenticates through the browser application flow may continue to block 430 thereafter. In some embodiments, the browser application may be configured to store information used for subsequent authentications. For example, in some embodiments, the browser application is configured to store, or cause storage of, the authentication success interface data, authentication success interface, received user authentication data, or the visual authentication indicia, utilized in an earlier authentication. The browser application may, after receiving a browser sign-in session request, such as at block 406, identify that the user previously authenticated, at decision 410, retrieve stored authentication success interface data, authentication success interface, or visual authentication indicia from a storage. Then, at block 430, the browser application may present the retrieved elements for rendering, thus presenting an authentication success rendering without a subsequent request to an application server.

Alternatively, in some embodiments, a browser application may store verification information that may be used for subsequent requests for authentication without receiving authentication credentials each time. For example, user authentication data, such as an authentication token, may be stored accessible to the browser, such as in a storage cookie or similar storage means. If a browser identifies a previous authentication, at decision 410, it may retrieve the stored user authentication data and request, for example from an application server, the corresponding authentication success interface comprising visual authentication indicia. The application may then provide a response using the transmitted user authentication data, effectively jumping to block 424 and continuing the flow as described above.

At block 432, the recorded authentication module captures an authentication success rendering including the visual authentication indicia. In some embodiments, the recorded authentication module contains a submodule, such as a display recorder module, configured to capture the authentication success rendering. In some embodiments, the recorded authentication module captures multiple authentication success renderings for use in subsequent parsing. For example, some embodiments may capture multiple authentication success renderings when an authentication success interface includes an animation such that multiple frames of the animation may be parsed and used to identify visual authentication indicia.

At block 434, the recorded authentication module optionally identifies a visual indicia type. In some embodiments, a visual indicia type may be predetermined. In some embodiments, a visual indicia type may be determined by communication with an application server, such as by sending a request for indicia type to an application server and receiving a response including the visual indicia type.

At block 436, the recorded authentication module optionally identifies a visual indicia decoder. In some embodiments, a visual indicia decoder may be predetermined. In some embodiments, a visual indicia decoder may be identified based on the visual indicia type identified at block 434. In some embodiments, the identified visual indicia decoder may include an algorithm, or series of algorithms, for use in parsing the authentication success rendering captured at block 432. In some embodiments, the identified visual indicia decoder may include an algorithm, or series of algorithms, for use in decoding the visual authentication indicia included in the authentication success rendering.

At block 440, the recorded authentication module parses the authentication success rendering to identify the visual authentication indicia. In some embodiments, parsing the authentication success rendering may utilize a visual indicia decoder. In some embodiments, such as when an animation, video, or the like is used in the authentication success rendering, multiple authentication success renderings may need to be parsed to identify visual authentication indicia, such as by comparing the animation, video, or the like at two different captured frames. In some embodiments, parsing the authentication success rendering may involve identifying multiple visual indicia portions to identify the visual indicia. For example, visual authentication indicia may be rendered in a repeated manner, such that a plurality of visual authentication indicia renderings are included in an authentication success rendering. In some embodiments, an authentication success rendering may include a visual authentication indicia first rendering and a visual authentication indicia second rendering. Some embodiments may parse the visual authentication indicia first rendering to identify a visual authentication indicia first portion, parse the visual authentication indicia second rendering to identify a visual authentication indicia second portion, and utilize the visual authentication indicia first portion and visual authentication indicia second portion to identify the visual authentication indicia, such as by combining the visual authentication indicia first portion and the visual authentication indicia second portion to form a complete visual authentication indicia.

At block 440, the visual authentication indicia is then decoded to identify user authentication data. Some embodiments may utilize a visual indicia decoder to decode the visual authentication indicia. In some embodiments, the identified user authentication data may be stored, such as in a memory cache or other storage medium. In some embodiments, the recorded authentication module may further verify the user authentication data, for example by validating a cryptographic signature included in the user authentication data At block 442, the recorded authentication module launches an authenticated service application session using the user authentication data. Some embodiments may execute a service application sign-in protocol utilizing the user authentication data.

For further explanation of the operations in FIGS. 4B and 4C, in an example embodiment, a browser application may present, using browser sign-in interface data received from an application server at block 414, a browser sign-in interface configured to receive authentication credentials comprising a username and a password. A user with the username "jdoe" and password "password1" may input these authentication credentials, such as through a password manager, and submit them at block 416. Further, in this example embodiment at block 418, an application server may perform an authentication process to verify the authentication credentials. The application server may authenticate these credentials by querying a database for a user account matching the authentication credentials provided. Further, in this example embodiment, the server may identify an authenticated user account matching these authentication credentials. The server may then create an authentication token associated with that authenticated user account/authentication credentials, such that the authentication token may be made in service requests to verify the requests are linked to the user account matching with username "jdoe" and password "password1." The application server may then generate visual authentication indicia, and include the visual authentication indicia in a browser interface, such as an authentication success interface, along with other elements to be rendered. The application server may then transmit a response that includes the authentication success interface, or at least the visual authentication indicia, such that it may be rendered, captured, parsed, decoded, and used to launch an authenticated service application session, as described above.

Some embodiments of the present invention provide further technical advantages in that each embodiment functions with many browsers operating in a plurality of ways. Specifically, in some embodiments of the present invention, because the data is captured directly from a rendering to a user device display, the present invention may function regardless of the process a browser application utilizes to cause such a rendering. Accordingly, even if an alternative application, which maintained the security and efficiency advantages described above, was used (e.g., an application other than the browser), such systems would work similarly to the embodiments described above. For example, a non-browser application with limited ways to transmit information to a local service application, but that still is configured to communicate with credentials managers, may be used in embodiments that operate similarly to embodiments described herein that utilize a browser application.

It will be appreciated that certain steps illustrated in FIGS. 3A, 3B, 4A, 4B, and 4C, may be performed by several systems, by independent systems, or by a combination of systems. For example, in regards to FIG. 3A, browser application 308 and service application module 310 may be configured such that both may utilize the service application module 214, processor 202, memory 204, and/or other modules and/or circuitry to perform steps as described above. Similarly, shared hardware/software modules, circuitry, or the like may perform multiple of the blocks 402-432. As such, the specific flows illustrated in FIGS. 3A/3B and 4A-4C are merely exemplary, and are not for purposes of limitation.

Exemplary User Interfaces

Rendered to a User Device Display

FIGS. 5, 6, 7, and 8 illustrate various user interfaces that may be rendered to a user device display. The user interfaces depicted may be rendered by various systems, a single system, or a combination of systems, modules, circuitry, or the like, including systems, modules, circuitry, or the like of embodiments of the present invention. It will be appreciated that FIGS. 6, 7, 8 and 9 are presented for illustrative purposes and are not meant to be limiting. Rather, FIGS. 6, 7, 8, and 9 are merely presented to further enhance the clarity of the present disclosure.

Figure 5:
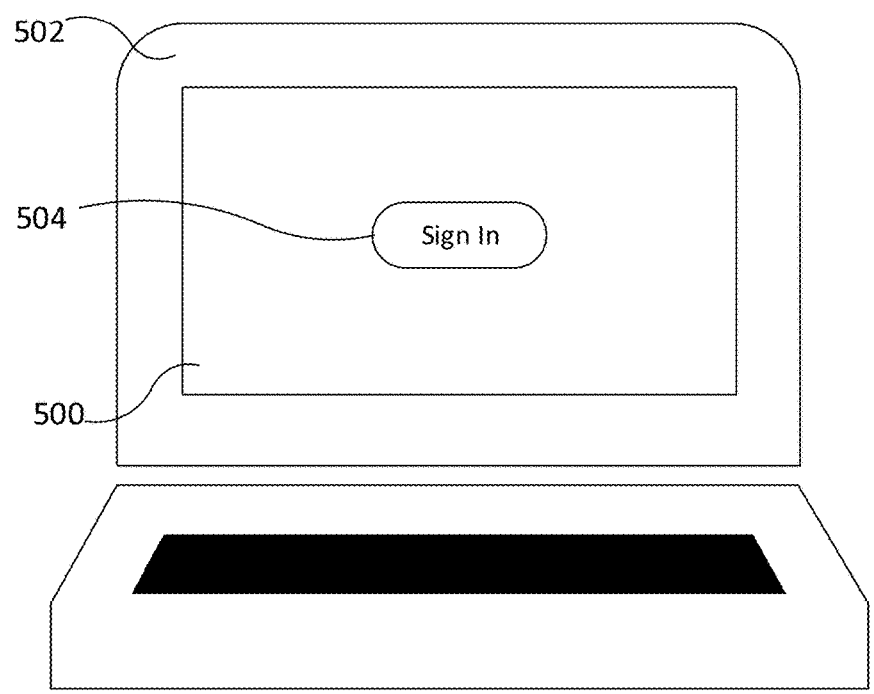
FIG. 5 illustrates an exemplary user device display rendering of an exemplary service application sign-in prompt interface configured in accordance with an example embodiment of the present invention.

FIG. 5 illustrates a service application sign-in prompt interface 500 rendered to a user device display 502 in accordance with an exemplary embodiment of the present invention. In the depicted example embodiment, service application sign-in prompt interface 500 includes only a single rendered element, sign-in button 504. In some embodiments, sign-in button 504 may be configured to receive user engagement, such as a click, tap, press, or other interaction. In some embodiments, the service application sign-in prompt interface 500 may be configured to output a service application sign-in request in response to user engagement, for example in response to user engagement with the sign-in button 504. In some embodiments, the user device associated with user device display 502 may be configured, such as through the service application, to output a browser sign-in session request configured to launch a browser sign-in session. In some embodiments, the user device may, through the service application for example, output the browser sign-in session request configured to launch a browser sign-in session such that a browser application launches and accesses a browser sign-in interface, such as the browser sign-in interface illustrated by FIG. 6.

Figure 6:
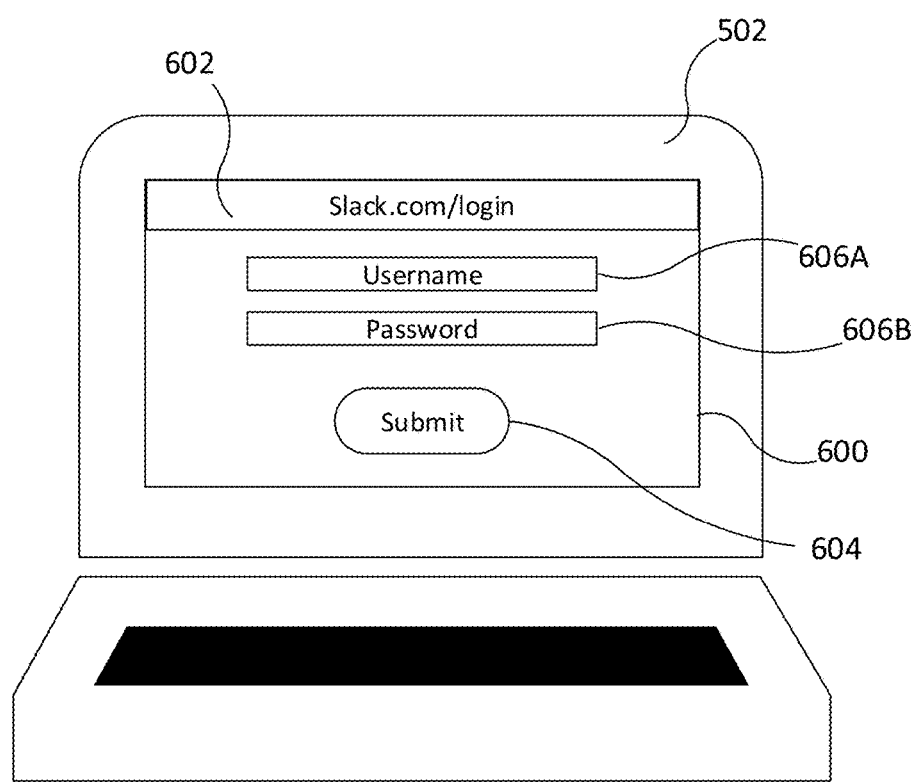
FIG. 6 illustrates an exemplary user device display rendering of a browser sign-in interface configured in accordance with an example embodiment of the present invention.

FIG. 6 illustrates a user device display rendering of a browser sign-in interface 600 rendered to a user device display 502 in accordance with an example embodiment. Browser sign-in interface 600 may be rendered in response to a browser sign-in session request output by an example embodiment to an application, for example a browser application. In some embodiments, the browser sign-in session request may be a protocol message sent to the browser application or the operating system of a user device associated with user device display 502, from a service application. For example, the embodiment in FIG. 5 may output the browser sign-in session request through a protocol in response to receiving a service application sign-in request in response to user engagement with sign-in button 504.

Rendered browser sign-in interface 600 may include a set of rendered components, such as browser address bar 602, sign-in submit button 604, which may include an authentication credential input set, such as username input 606A and password input 606B. In some embodiments, browser address bar may appear as part of a browser application. Browser address bar may be known in the art to be rendered to indicate to a user the web address that the user is currently viewing.

In some embodiments, the authentication credential input set may include components that are configured to receive user engagement. For example, in the depicted embodiment, username input 606A and password input 606B may be configured to receive user engagement indicative of the user's username and password. Alternatively or additionally, in the depicted embodiment, the browser application may be configured to receive authentication credentials from a credentials manager. Communications between a browser application and a credentials manager may occur automatically, such as upon successfully configuring the browser sign-in interface, launch of the browser, or through data indicative of any other event, such that authentication credentials are received from a credentials manager without user engagement with the browser sign-in interface. Alternatively or additionally, a browser application may receive authentication credentials, such as a username and password in the depicted embodiment, from a credentials manager in response to user engagement with one or more of the input components in the authentication credential input set. Specifically, in the depicted embodiment, the browser may receive a username and a password as authentication credentials in response to user engagement with either username input 606A or password input 606B.

Browser sign-in interface 600 may be configured to cause transmission of authentication credentials to an application server capable of performing an authentication process and transmitting a response. In the depicted embodiment, sign-in submit button 604 may be configured such that the user may engage with sign-in submit button 604 to submit authentication credentials for authentication, for example authentication credentials entered into authentication credential inputs 606A and 606B. For example, in the depicted embodiment, user engagement with sign-in submit button 604 may cause the browser application to transmit the authentication credentials, such as those provided in inputs 606A and 606B, to an application server that may perform an authentication process using the transmitted authentication credentials and provide a response.

Figure 7:
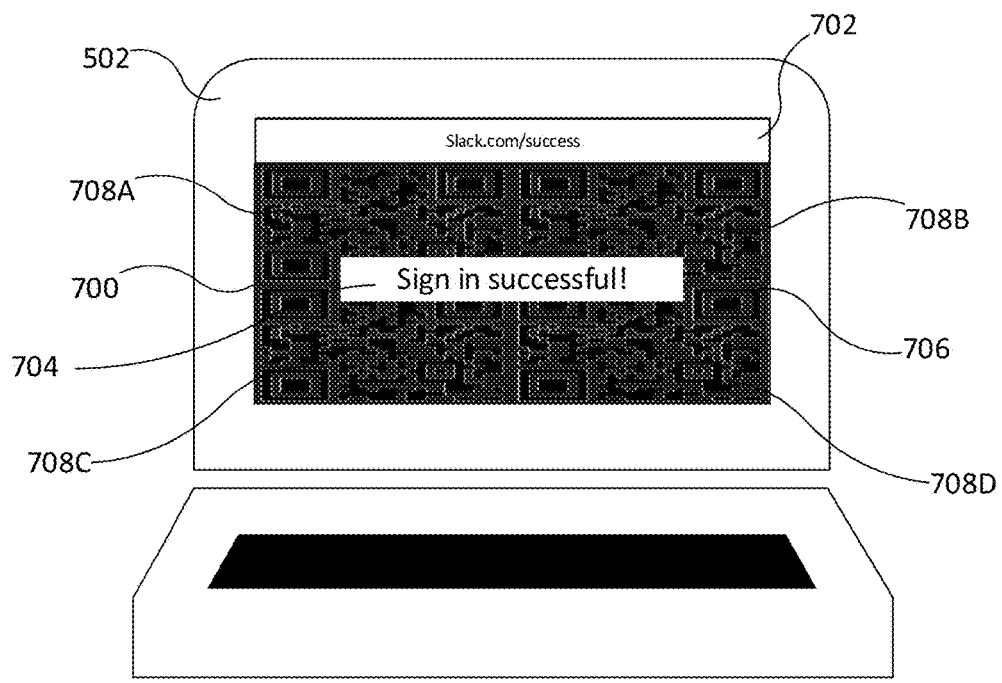
FIGS. 7 and 8 illustrate exemplary authentication success renderings configured in accordance with example embodiments of the present invention.

FIG. 7 illustrates an authentication success rendering of an exemplary authentication success interface 700 rendered to a user device display 502 associated with a laptop user device in accordance with an example depicted embodiment. In the depicted embodiment, a browser application may receive authentication success interface data from an application server in response to user engagement with sign-in submit button 604. The browser application may configure, and subsequently render, authentication success interface 700 in response to a receiving authentication success interface data from a server application after successful authentication. In the depicted embodiment, the authentication success interface includes a plurality of components to render, including an address bar 702, a sign-in success message 704, and background image 706. Address bar 702 may serve the same or a similar function to the function described in FIG. 6, so subsequent discussion is omitted for the sake of brevity. In the depicted embodiment, background image 706 includes visual authentication indicia rendered in a repeated manner, specifically, visual authentication indicia that is an image, encoded similarly to a QR code, in four quadrants of the background (visual authentication indicia rendering 708A rendered in the top left quadrant, visual authentication indicia rendering 708B rendered in the top right quadrant, visual authentication indicia rendering 708C rendered in the bottom left quadrant, and visual authentication indicia rendering 708D rendered in the bottom right quadrant).

For example, in the depicted embodiment, a browser application receive authentication success interface data and use the authentication success interface data to configure the authentication success interface to include the visual authentication indicia rendered in a repeated manner (708A-708D). Further, in the depicted embodiment, the browser application may present the authentication success interface 700 during a browser sign-in session, such that an initiated display recorder module may be configured to capture the user device display every 0.1 seconds. The initiated display recorder module may capture the depicted rendering of authentication success interface 700, which may be referred to as an "authentication success rendering" as it includes visual authentication indicia." The depicted user device may have implemented an embodiment of the present invention configured to parse the authentication success rendering to identify visual authentication indicia. In some embodiments, one of the repeated instances of the visual authentication indicia, such as visual authentication indicia rendering 708C, may be identified. Alternatively or additionally, some embodiments may be configured to utilize multiple renderings to identify the visual authentication indicia. For example, in the depicted embodiment, the sign-in success message 704 is rendered on top of visual authentication indicia renderings 708A and 708B. Some embodiments may be configured to identify a first portion of a first visual authentication indicia rendering and identify a second portion of a second visual authentication rendering, such that the second portion can be used to identify a complete visual authentication indicia rendering. For example, in the depicted embodiment in FIG. 7, sign-in success message 704 is blocking a lower portion of both visual authentication indicia rendering 708A and visual authentication indicia rendering 708B. Some embodiments may be configured to identify a first portion, such as the unblocked portion from visual authentication indicia rendering 708A, and identify a second portion, for example the portion of the image blocked by sign-in success message 704, from another instance, such as visual authentication indicia rendering 708B. Furthermore, the depicted embodiment may then decode the visual authentication indicia, a single rendering of the visual authentication indicia, or an identified complete visual authentication indicia, to identify user authentication data encoded by the visual authentication indicia.

Figure 8:
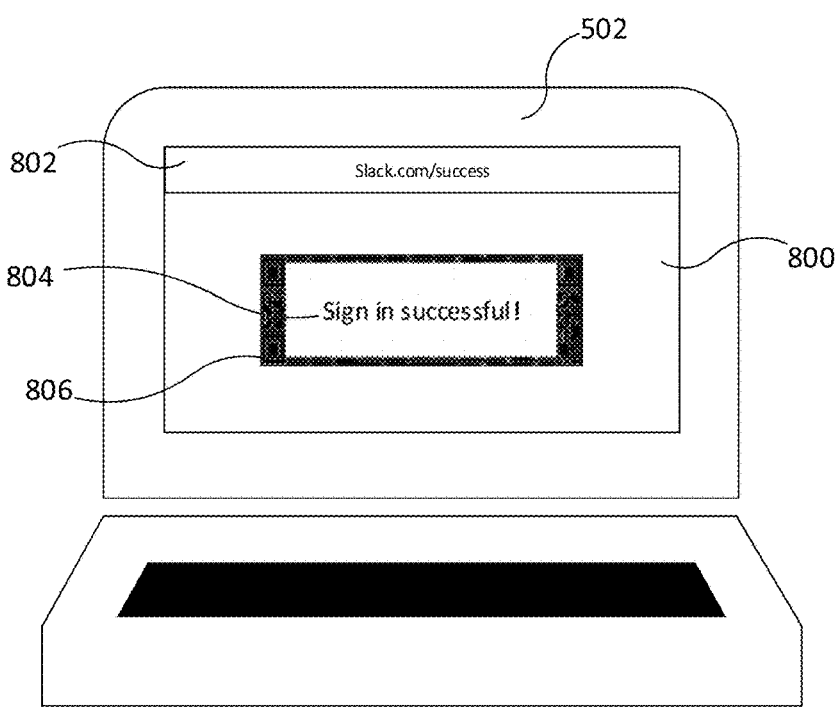

FIG. 8 illustrates yet another exemplary authentication success interfaces 800 rendered to a user device display 502 associated with a laptop user device in accordance with an example, depicted embodiment. In the depicted embodiment, a browser application may receive authentication success interface data, and subsequently configure and present, authentication success interface 800 in response to a successful authentication on a server application prompted by user engagement with the sign-in submit button 604 in FIG. 6. In the depicted embodiment, the authentication success interface includes a plurality of components to render, including an address bar 802, a sign-in success message 804, and visual authentication indicia 806. Address bar 802 may serve the same or a similar function to the function described in FIG. 6, In the depicted embodiment, visual authentication indicia 806 may be rendered as a border element to sign-in success message 804. Further, in the depicted embodiment, the browser application may present the authentication success interface 800 during a browser sign-in session, such that the depicted embodiment may have previously initiated a module, such as a display recorder module, configured to capture the user device display 502 every 0.1 seconds. The initiated display recorder module may capture the depicted rendering of the authentication success interface 800 rendered to the user device display 502 including visual authentication indicia. The user device display rendering depicted in FIG. 8 also includes visual authentication indicia, such that it may be referred to as an "authentications success rendering." The user device in the depicted user device may include an embodiment of the present invention configured to parse the authentication success rendering and identify visual authentication indicia. Furthermore, the depicted user device may include an embodiment of the present invention configured to decode the visual authentication indicia to identify user authentication data encoded by the visual authentication indicia. The depicted user device may include an embodiment of the present invention configured to parse the depicted authentication success rendering and/or decode the visual authentication indicia using an algorithm or set of algorithms. For example, parsing and decoding algorithms may be associated with a particular identified visual authentication indicia type, such as for use in decoding visual authentication indicia displayed as a border element that uses pixel color value to encode data, and the depicted embodiment may use corresponding algorithms, such as those associated with an identified visual indicia decoder, parse the depicted authentication success rendering and/or decode the depicted visual authentication indicia.

FIGS. 7 and 8 each illustrate merely one such embodiment detecting merely one instance of visual authentication indicia. As will be appreciated in light of the disclosure herein, many types of visual authentication indicia may be used. For example, balloons may be used with different colors to encode data, flowers may be used with different colors to encode data, vertical or horizontal bars with varying sizes may be used to encode data, and/or the like. Visual authentication indicia may be rendered as a background, as a border to a component in the interface, as a border to the interface, and/or the like. As will be appreciated, visual authentication indicia may be rendered in many forms such that a corresponding algorithm may be used to parse and/or decode the visual authentication indicia as rendered.

CONCLUSION

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to provide authenticated access to a service application comprising at least a processor, and a memory associated with the processor having computer coded instructions therein, with the computer coded instructions configured to, when executed by the processor, cause the apparatus to:
    present, utilizing a service application module, a service application sign-in prompt interface for rendering via a user device display of a user device;
    receive, utilizing the service application module, a service application sign-in request in response to user engagement with the service application sign-in prompt interface;
    output, utilizing the service application module and based on the service application sign-in request, a browser sign-in session request configured to launch a browser sign-in session associated with a browser application at the user device;
    present an authentication success rendering via the user device display based at least in part on verification of authentication credentials from the browser application, the authentication success rendering comprising visual authentication indicia;
    initiate a display recorder module configured to capture, during the browser sign-in session via the user device display of the user device, the authentication success rendering comprising the visual authentication indicia in the user device display of the user device; and
    in response to capturing the authentication success rendering comprising the visual authentication indicia in the user device display of the user device, launch, utilizing a recorded authentication module, an authenticated service application session at the user device.

2. The apparatus of claim 1, wherein the computer coded instructions configured to cause the apparatus to launch the authenticated service application session further comprises computer coded instructions configured to, when executed by the processor, cause the apparatus to:
    parse, utilizing the recorded authentication module and utilizing a visual indicia decoder, the authentication success rendering to identify the visual authentication indicia;
    decode, utilizing the recorded authentication module and utilizing the visual indicia decoder, the visual authentication indicia to identify user authentication data; and
    execute, utilizing the recorded authentication module, a service application sign-in protocol using the user authentication data to launch the authenticated service application session.

3. The apparatus of claim 2, wherein the computer coded instructions configured to cause the apparatus to parse, utilizing the recorded authentication module and utilizing the visual indicia decoder, the authentication success rendering to identify the visual authentication indicia comprises computer coded instructions that, when executed by the processor, cause the apparatus to parse, utilizing the recorded authentication module and utilizing the visual indicia decoder, the authentication success rendering to identify the visual authentication indicia from a plurality of visual authentication indicia renderings presented in a repeated manner.

4. The apparatus of claim 2, wherein the computer coded instructions configured to cause the apparatus to launch the authenticated service application session further comprises computer coded instructions configured to, when executed by the processor, cause the apparatus to:
configure, utilizing the recorded authentication module, the authenticated service application session to authenticate service requests made during the authenticated service application session using the user authentication data.

5. The apparatus of claim 2, wherein the computer coded instructions configured to cause the apparatus to launch the authenticated service application session further comprises computer coded instructions configured to, when executed by the processor, cause the apparatus to:
configure, utilizing the recorded authentication module, the authenticated service application session such that service requests made during the authenticated service application session are associated with an authenticated service application user account using the user authentication data.

6. The apparatus of claim 2, wherein the computer coded instructions configured to cause the apparatus to parse, utilizing the recorded authentication module, the authentication success rendering to identify the visual authentication indicia comprises computer coded instructions configured to, when executed by the processor, cause the apparatus to:
parse, utilizing the recorded authentication module and the visual indicia decoder, the authentication success rendering to identify a first visual authentication indicia portion associated with a first visual authentication indicia rendering;
parse, utilizing the recorded authentication module and the visual indicia decoder, the authentication success rendering to identify a second visual authentication indicia portion associated with a second visual authentication indicia rendering; and
identify the visual authentication indicia using the first visual authentication indicia portion and the second visual authentication indicia portion.

7. The apparatus of claim 2, wherein the computer coded instructions are further configured to, when executed by the processor, cause the apparatus to:
capture, utilizing the display recorder module, a first authentication success rendering comprising a first visual authentication indicia rendering; and
capture, utilizing the display recorder module, a second authentication success rendering comprising a second visual authentication indicia rendering,
wherein the computer coded instructions configured to cause the apparatus to parse, utilizing the recorded authentication module and utilizing the visual indicia decoder, the authentication success rendering to identify the visual authentication indicia comprises computer coded instructions configured to, when executed by the processor, cause the apparatus to:
parse, utilizing the recorded authentication module and the visual indicia decoder, the first authentication success rendering to identify the first visual authentication indicia rendering;
parse, utilizing the recorded authentication module and the visual indicia decoder, the second authentication success rendering to identify the second visual authentication indicia rendering; and
identify the visual authentication indicia using the first visual authentication indicia rendering and the second visual authentication indicia rendering.

8. The apparatus of claim 2, wherein the computer coded instructions are further configured to, when executed by the processor, cause the apparatus to:
identify, utilizing the recorded authentication module, a visual indicia type associated with the visual authentication indicia; and
identify, utilizing the recorded authentication module, the visual indicia decoder associated with the visual indicia type.

9. The apparatus of claim 1, wherein the browser sign-in session request is further configured to cause the browser application to prompt interaction with a credentials manager.

10. The apparatus of claim 1, wherein the visual authentication indicia identifies at least one authentication data cache location storing user authentication data.

11. The apparatus of claim 1, wherein the visual authentication indicia encodes an authentication token.

12. The apparatus of claim 1, wherein the computer coded instructions are further configured to, when executed by the processor, cause the apparatus to:
detect, utilizing an abandonment detection module, a session abandonment event associated with the browser sign-in session; and
terminate capture by the display recorder module.

13. The apparatus of claim 1, wherein the computer coded instructions are further configured to, when executed by the processor, cause the apparatus to:
identify, utilizing an abandonment detection module, a timeout value;
track, utilizing the abandonment detection module, a recording time associated with the display recorder module;
determine, utilizing the abandonment detection module, the recording time exceeded the timeout value; and
terminate capture by the display recorder module.

14. A computer-implemented method for providing authenticated access to a service application comprising:
presenting, utilizing a service application module, a service application sign-in prompt interface for rendering via a user device display of a user device;
receiving, utilizing the service application module, a service application sign-in request in response to user engagement with the service application sign-in prompt interface;
outputting, utilizing the service application module and based on the service application sign-in request, a browser sign-in session request configured to launch a browser sign-in session associated with a browser application at the user device;
presenting an authentication success rendering via the user device display based at least in part on verification of authentication credentials from the browser application, the authentication success rendering comprising visual authentication indicia;
initiating a display recorder module configured to capture, during the browser sign-in session via the user device display of the user device, the authentication success rendering comprising the visual authentication indicia in the user device display of the user device; and in response to capturing the authentication success rendering comprising the visual authentication indicia in the user device display of the user device, launching, utilizing a recorded authentication module, an authenticated service application session at the user device.

15. The computer-implemented method of claim 14, wherein launching the authenticated service application session comprises:

parsing, utilizing the recorded authentication module and utilizing a visual indicia decoder, the authentication success rendering to identify the visual authentication indicia;

decoding, utilizing the recorded authentication module and utilizing the visual indicia decoder, the visual authentication indicia to identify user authentication data; and executing, utilizing the recorded authentication module, a service application sign-in protocol using the user authentication data to launch the authenticated service application session.

16. The computer-implemented method of claim 14, further comprising:

detecting, utilizing an abandonment detection module, a session abandonment event associated with the browser sign-in session; and terminating capture by the display recorder module.

17. A computer program product for providing authenticated access to a service application, the computer program product comprising at least one non-transitory computer-readable storage medium having computer-executable program code instructions stored therein, the computer-executable program code instructions comprising program code instructions for:

presenting, utilizing a service application module, a service application sign-in prompt interface for rendering via a user device display of a user device;

receiving, utilizing the service application module, a service application sign-in request in response to user engagement with the service application sign-in prompt interface;

outputting, utilizing the service application module and based on the service application sign-in request, a browser sign-in session request configured to launch a browser sign-in session associated with a browser application at the user device;

presenting an authentication success rendering via the user device display based at least in part on verification of authentication credentials from the browser application, the authentication success rendering comprising visual authentication indicia;

initiating a display recorder module configured to capture, during the browser sign-in session via the user device display of the user device, the authentication success rendering comprising the visual authentication indicia in the user device display of the user device; and in response to capturing the authentication success rendering comprising the visual authentication indicia in the user device display of the user device, launching, utilizing a recorded authentication module, an authenticated service application session at the user device.

18. The computer program product of claim 17, wherein launching the authenticated service application session comprises:

parsing, utilizing the recorded authentication module and utilizing a visual indicia decoder, the authentication success rendering to identify the visual authentication indicia;

decoding, utilizing the recorded authentication module and utilizing the visual indicia decoder, the visual authentication indicia to identify user authentication data; and executing, utilizing the recorded authentication module, a service application sign-in protocol using the user authentication data to launch the authenticated service application session.

19. The computer program product of claim 18, wherein parsing the authentication success rendering to identify the visual authentication indicia comprises:

parsing, utilizing the recorded authentication module and the visual indicia decoder, the authentication success rendering to identify a first visual authentication indicia portion associated with a first visual authentication indicia rendering;

parsing, utilizing the recorded authentication module and the visual indicia decoder, the authentication success rendering to identify a second visual authentication indicia portion associated with a second visual authentication indicia rendering; and identifying the visual authentication indicia using the first visual authentication indicia portion and the second visual authentication indicia portion.

* * * * *